United States Patent [19]

Spiel et al.

[11] 4,155,293

[45] May 22, 1979

[54] CONTINUOUS COOKING APPARATUS AND PROCESS

[75] Inventors: Albert Spiel, Yonkers, N.Y.; Soon K. Kim, Ridgewood, N.J.; Sigmund H. Schutt, Morristown, N.J.; James Arthur, North Bergen, N.J.

[73] Assignee: Nabisco, Inc., East Hanover, N.J.

[21] Appl. No.: 816,182

[22] Filed: Jul. 15, 1977

Related U.S. Application Data

[63] Continuation of Ser. No. 661,113, Feb. 25, 1976, abandoned.

[51] Int. Cl.² .............................................. A47J 37/12
[52] U.S. Cl. ........................................... 99/352; 99/404
[58] Field of Search ................. 99/352, 345, 348–349, 99/353, 404–405, 406, 408, 443 C; 198/208; 220/228

[56] References Cited

U.S. PATENT DOCUMENTS

| | | | |
|---|---|---|---|
| 1,290,771 | 1/1919 | Meadows | 220/228 X |
| 2,319,561 | 5/1943 | Scharsch | 99/404 |
| 3,223,024 | 12/1965 | Benson et al. | 99/352 |
| 3,264,974 | 8/1966 | Miller et al. | 99/443 C X |
| 3,282,197 | 11/1966 | Smith, Jr. | 99/405 |
| 3,446,138 | 5/1969 | Hasten et al. | 99/404 |
| 3,472,155 | 10/1969 | Cardis et al. | 99/404 |
| 3,614,924 | 2/1972 | Sijbring | 99/406 |
| 3,690,895 | 9/1972 | Amadon et al. | 99/404 X |
| 3,731,614 | 5/1973 | Smith et al. | 99/404 |
| 3,733,202 | 5/1973 | Marmor | 99/408 X |
| 3,736,860 | 6/1973 | Vischer, Jr. | 99/443 C X |
| 3,812,775 | 5/1974 | Sijbring | 99/404 |

*Primary Examiner*—Harvey C. Hornsby
*Assistant Examiner*—Arthur O. Henderson
*Attorney, Agent, or Firm*—Fisher, Christen & Sabol

[57] ABSTRACT

Apparatus for continuously, quickly and gently cooking and leaching food pieces such as compacted soy bean products with a cooking liquid, such as water, at elevated temperature comprising an elongate tank for the liquid wherein the tank has a product infeed end and a product discharge end. A driven endless conveyor having an upper flight passing through the liquid in the tank carries food pieces on its upper flight through the hot liquid. There is provided a plurality of means along one or both sides of the tank for withdrawing liquid from the tank at spaced apart points along the side of the tank, means for heating the withdrawn liquid and means for returning the heated liquid to the tank at a plurality of points adjacent the center line thereof.

27 Claims, 21 Drawing Figures

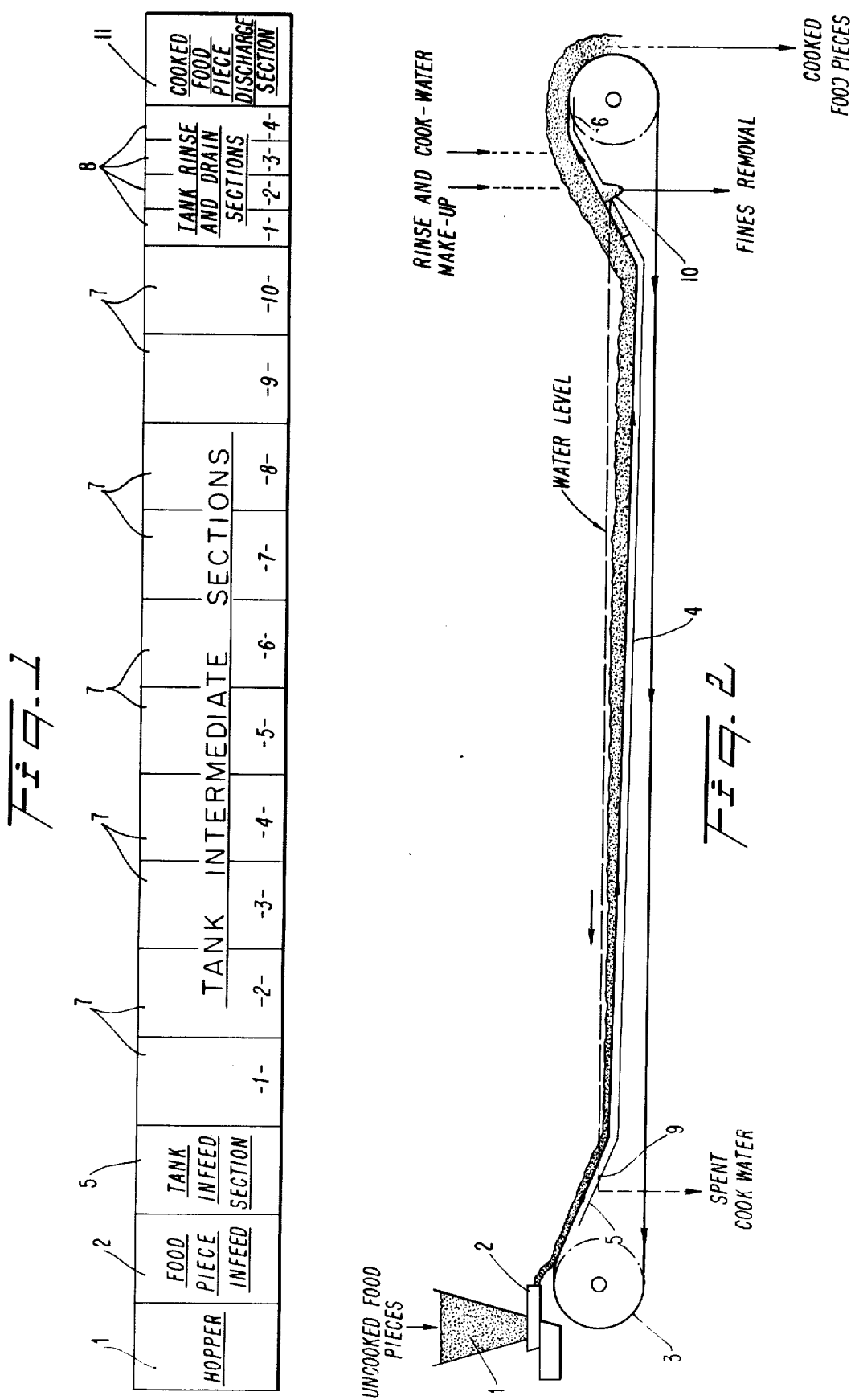

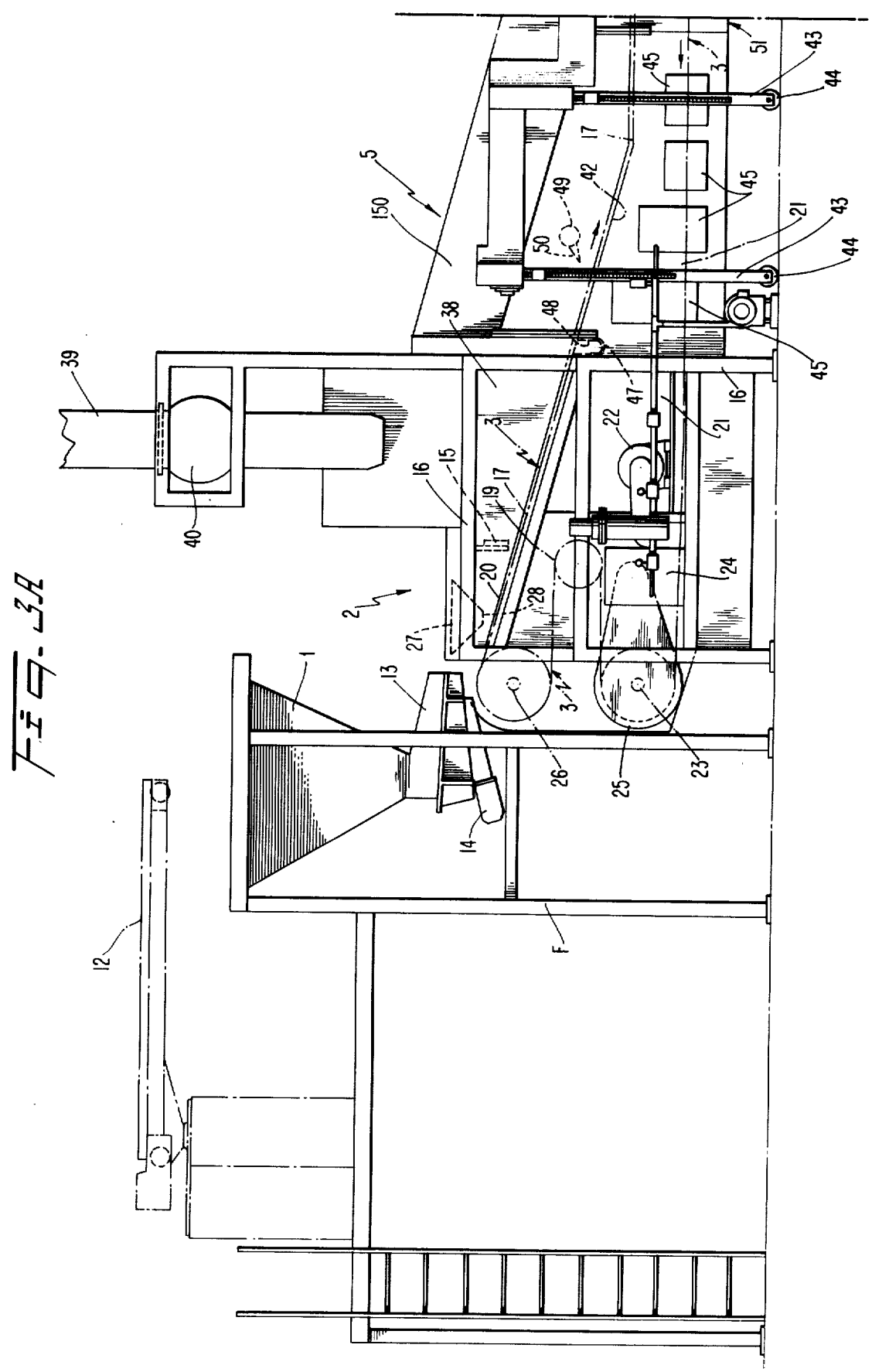

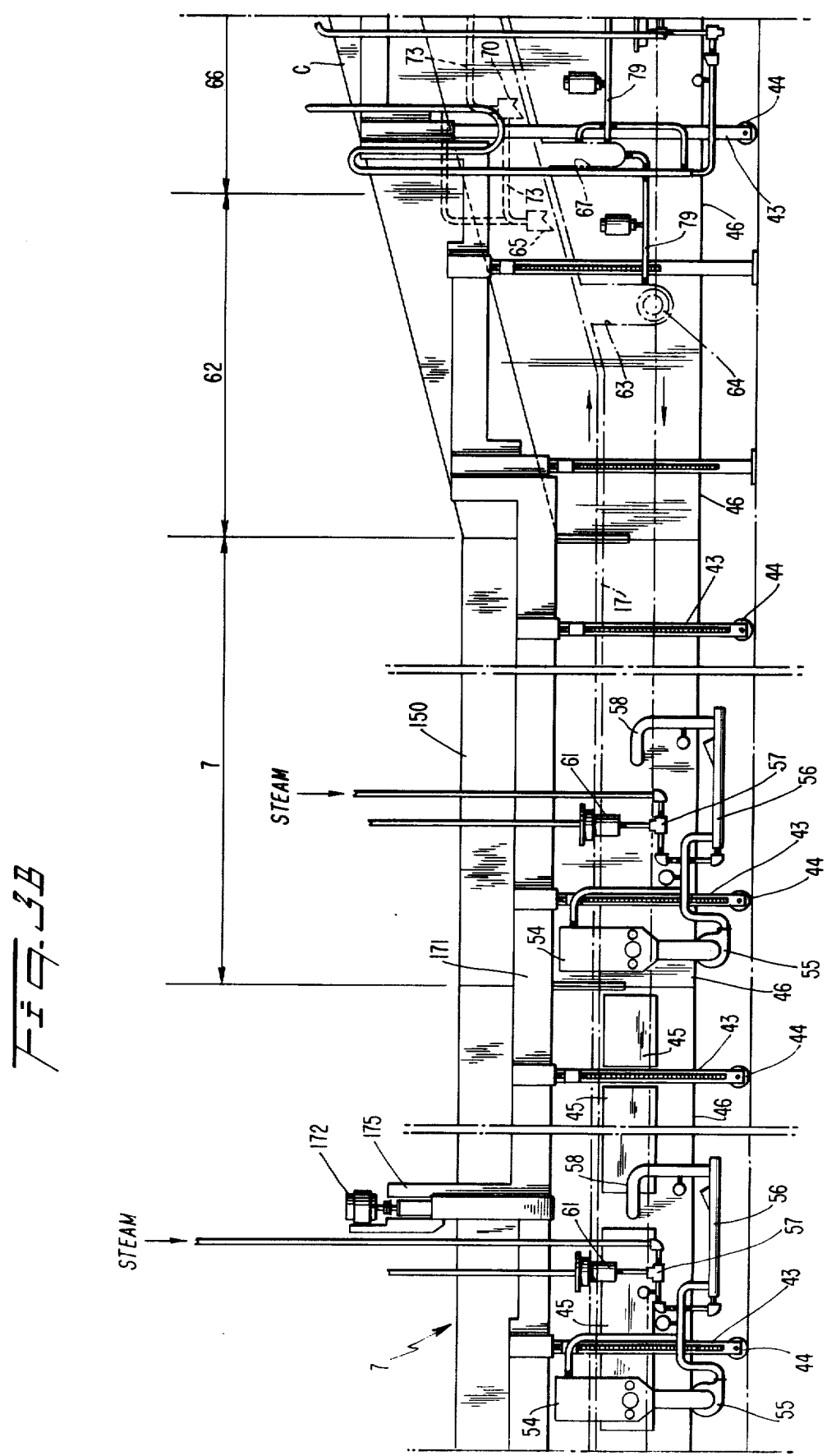

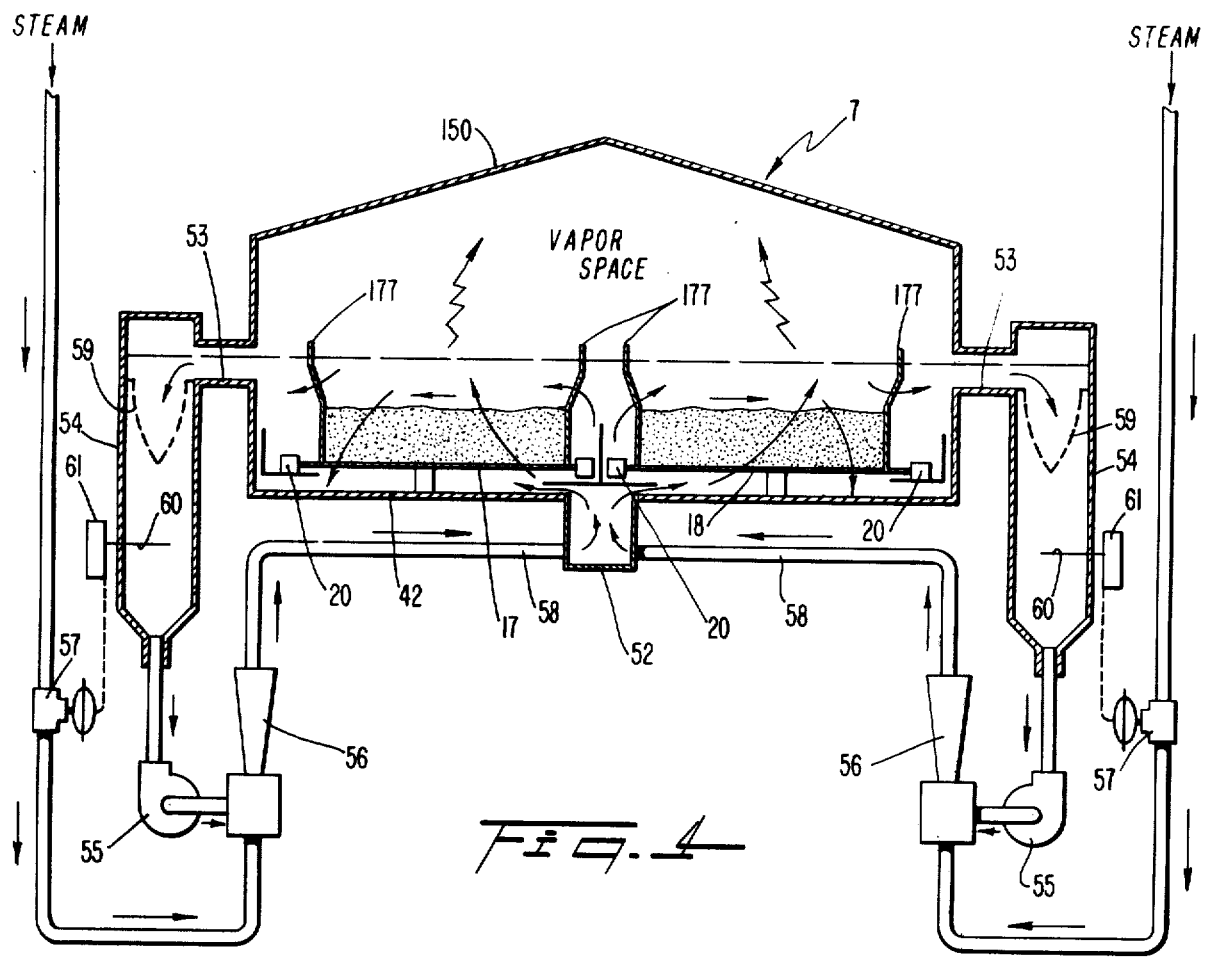
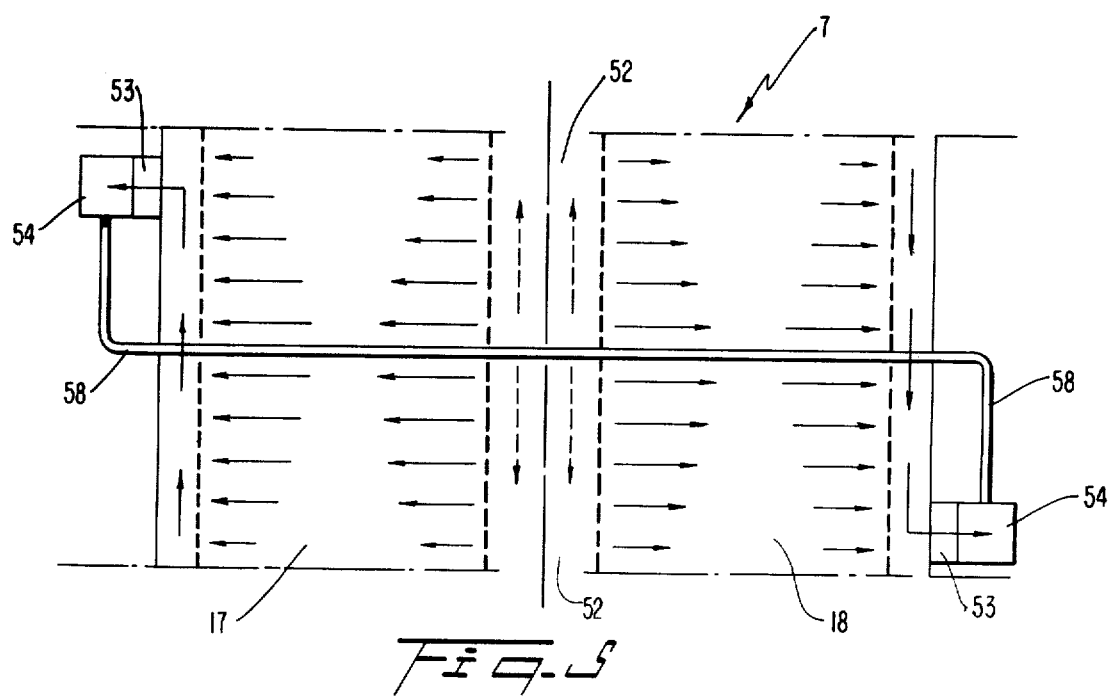

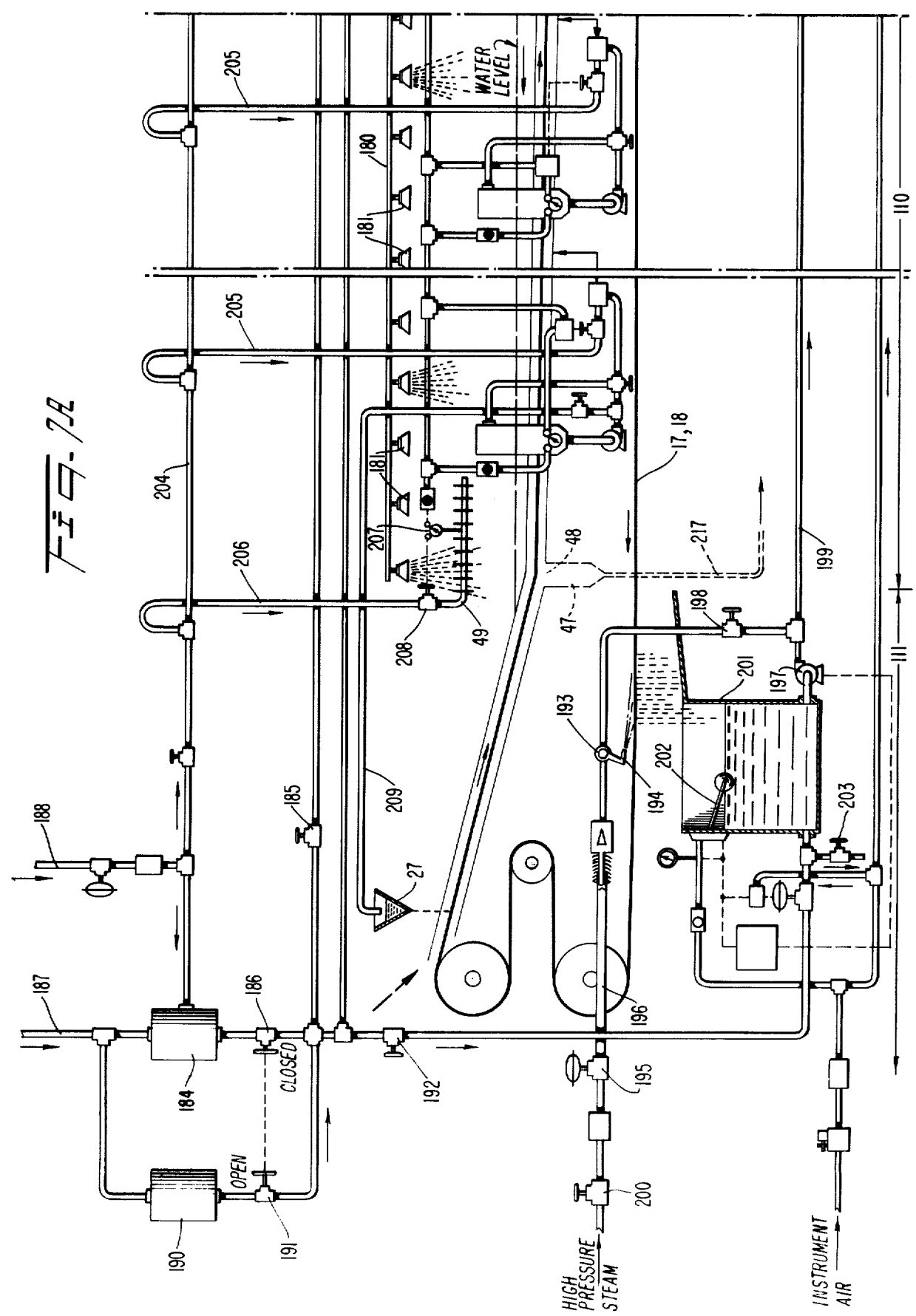

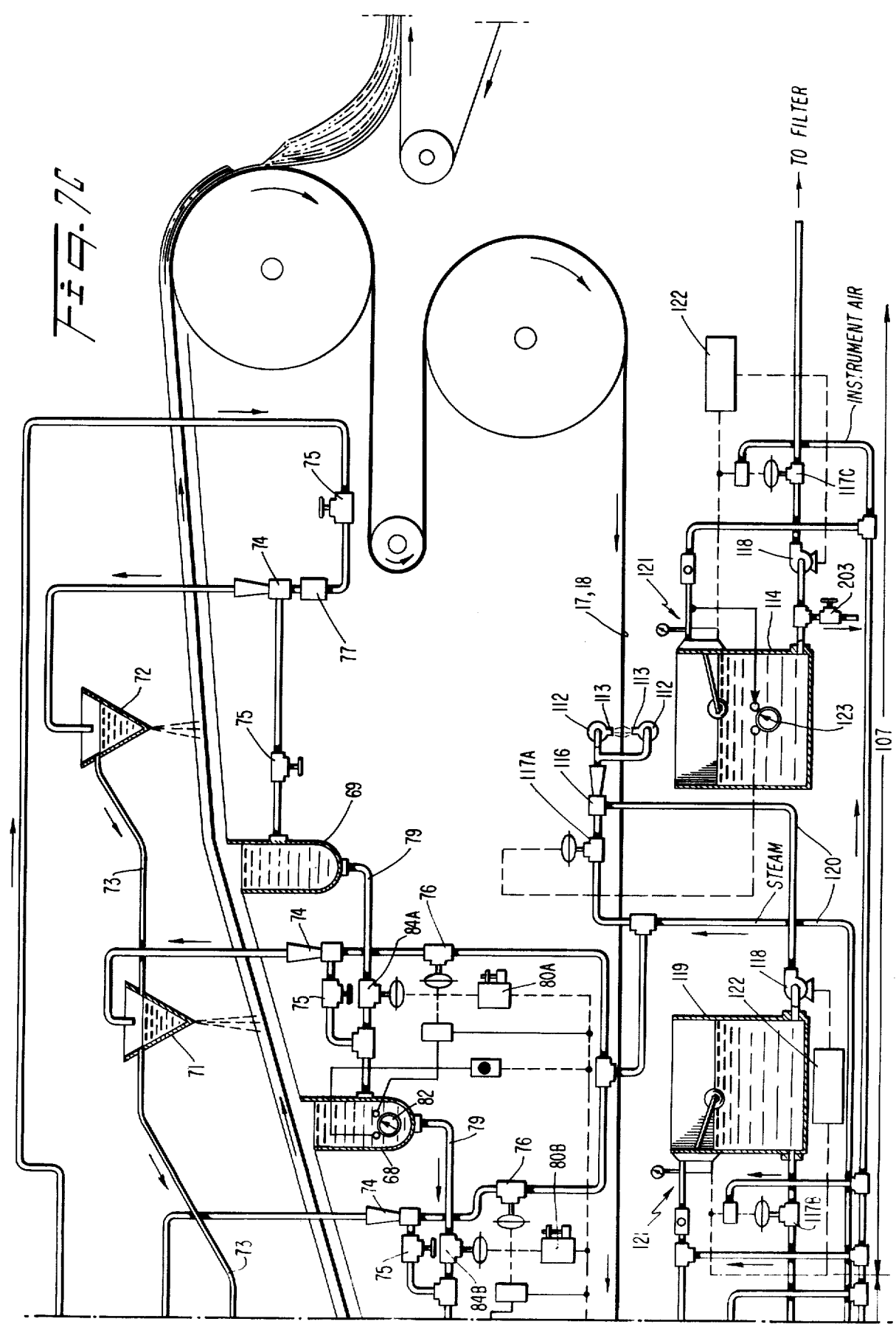

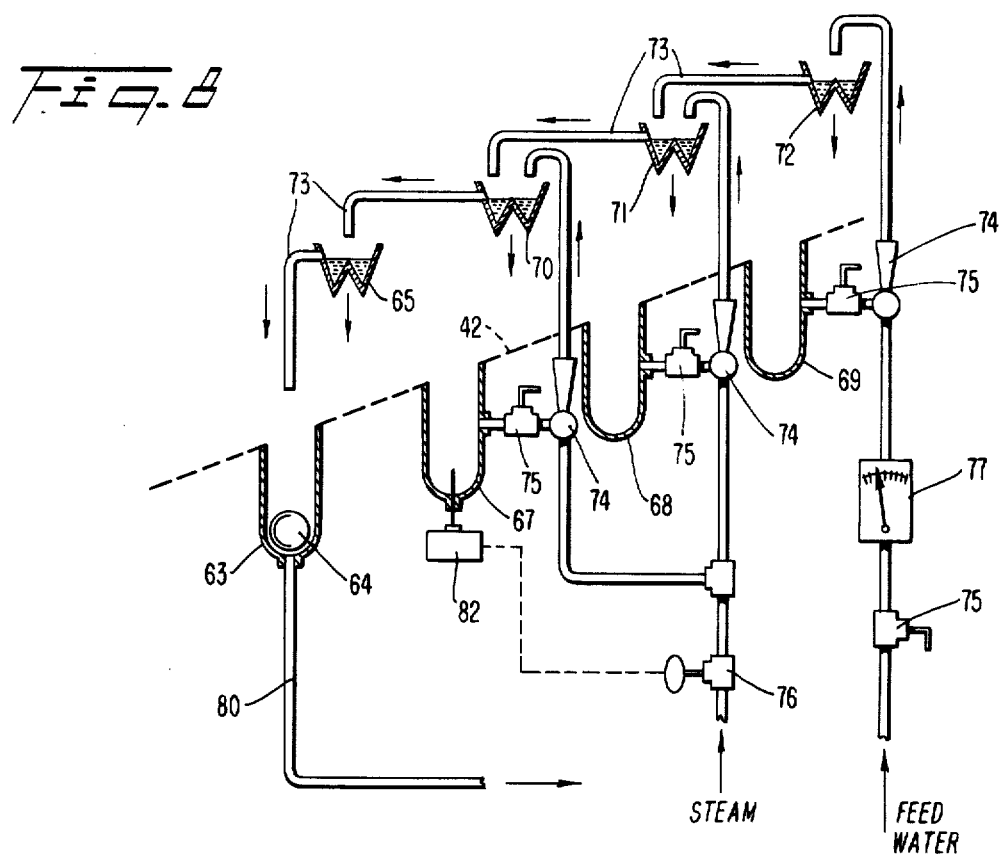
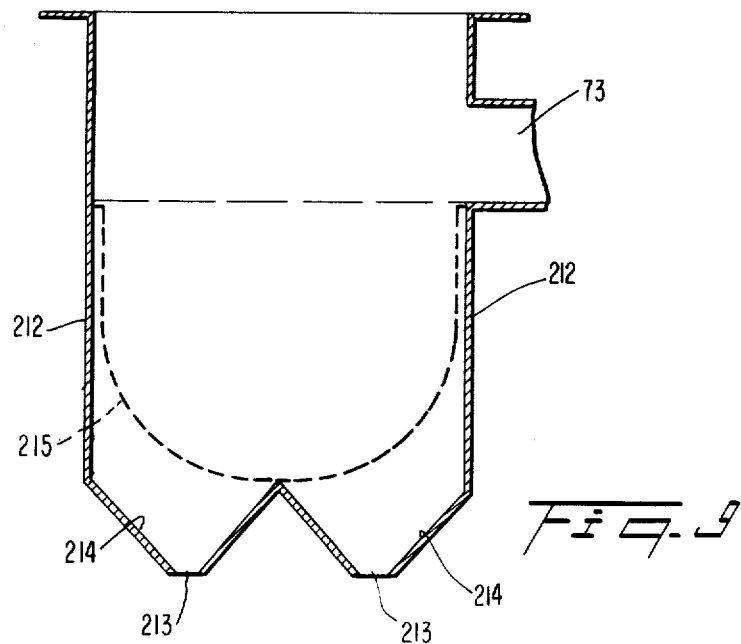

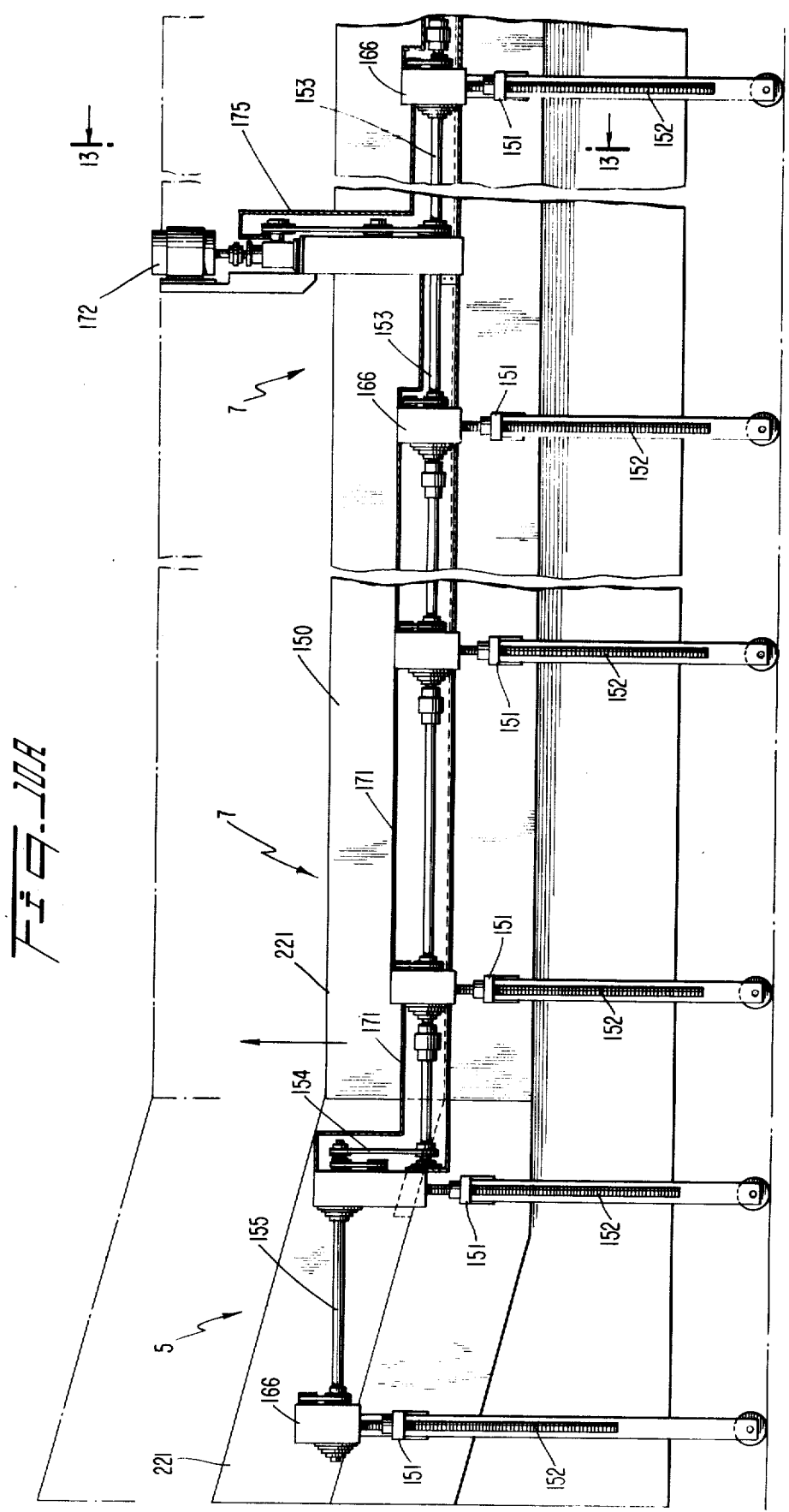

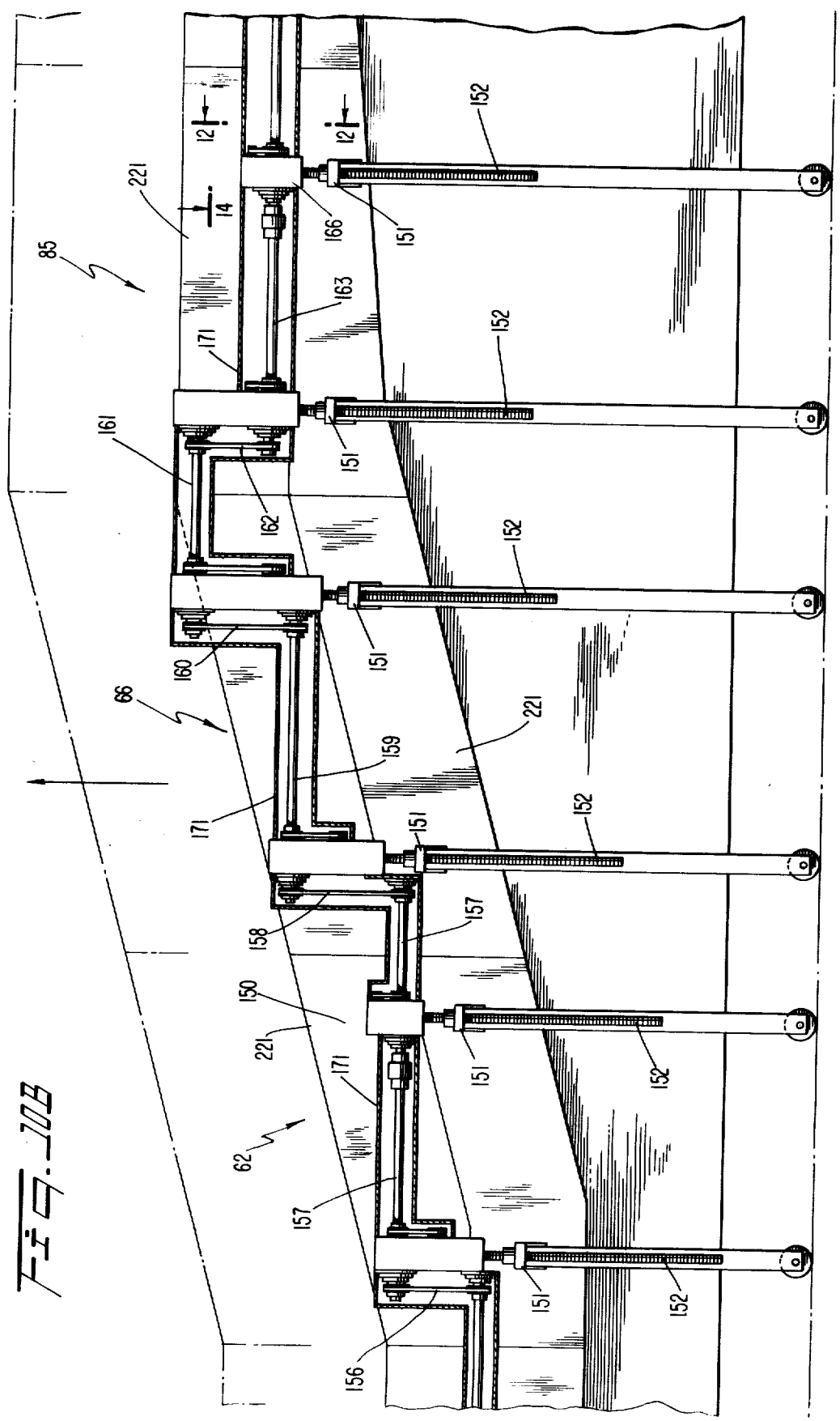

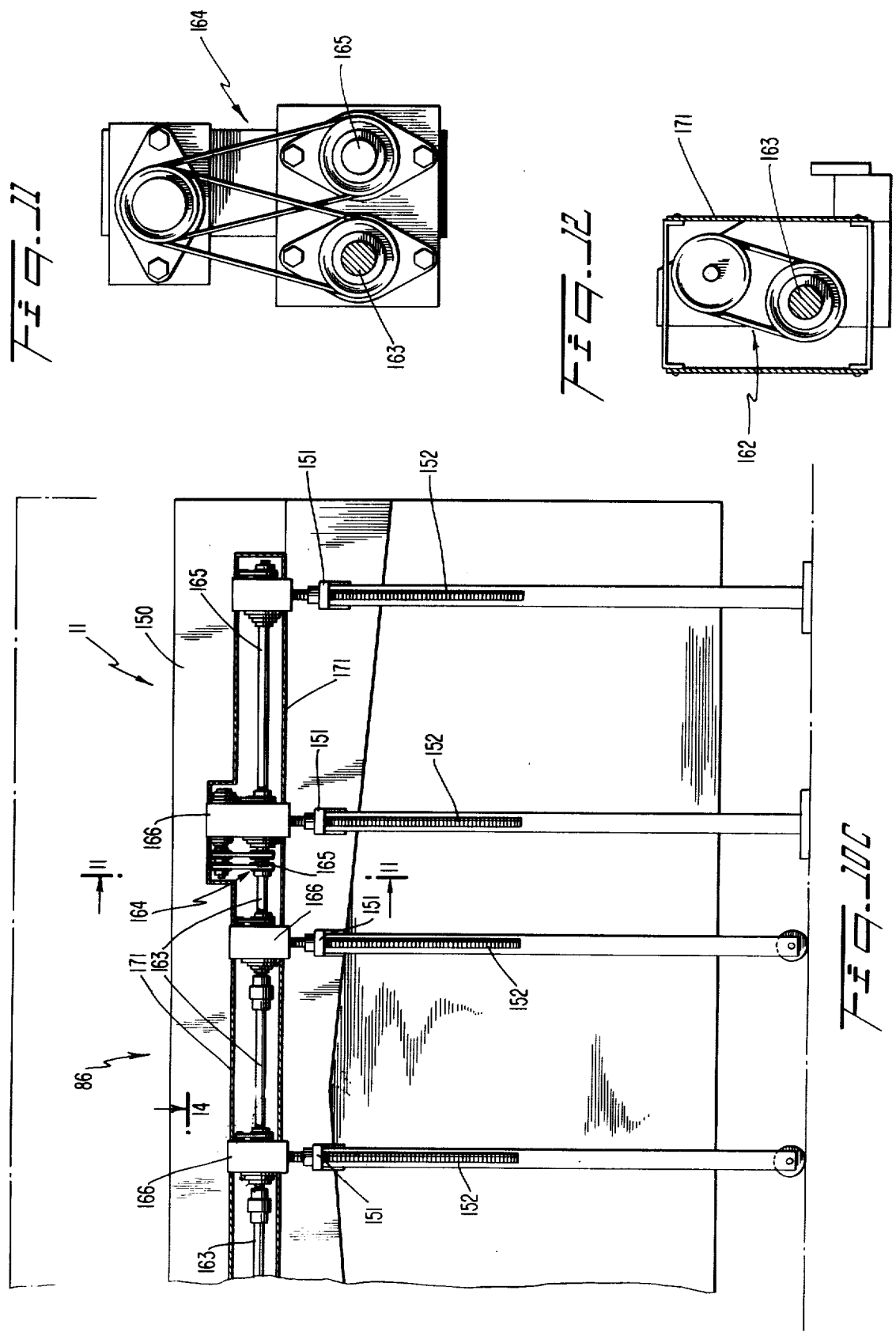

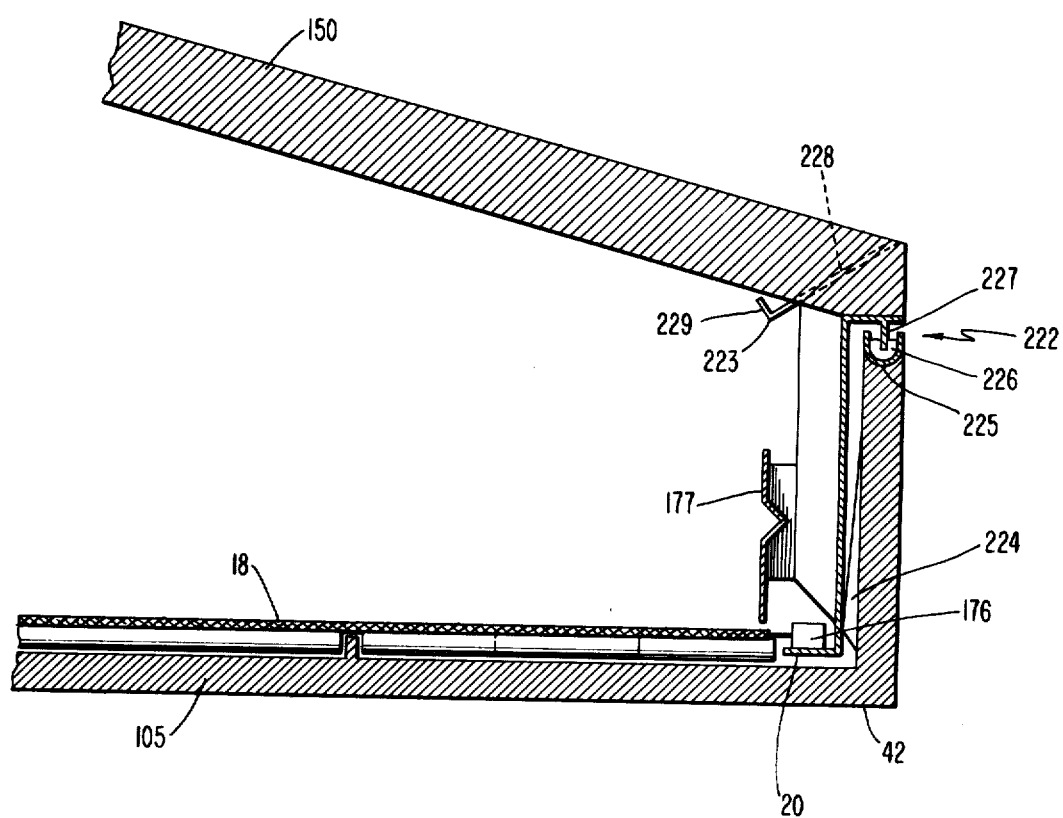

ered and averts overcooking or under cooking of the food pieces or portions thereof. It allows the establishment of a tem
CONTINUOUS COOKING APPARATUS AND PROCESS This is a continuation of application Ser. No. 661,113, filed Feb. 25, 1976, now abandoned.

BACKGROUND OF THE INVENTION (a) Field of the Invention

The present invention relates to a novel apparatus for continuously cooking and leaching food pieces with a cooking liquid such as water at an elevated temperature and is particularly concerned with the gentle handling of fragile food pieces during leaching or cooking in solvents or liquids, such as water, with the application of heat and with the controlled contact of mechanical transfer means and leaching medium so as to avoid degradation of fragile food pieces.

(b) Description of the Prior Art

Numerous apparatuses have been disclosed in the prior art for continuously cooking or otherwise treating food. As an illustration, U.S. Pat. No. 3,886,856 discloses an apparatus for continuously cooking grain under pressure by utilizing a conveyor belt having a plurality of conveying members and a pair of restriction members which form a fluid pressure seal with the conveyor members at predetermined locations along the path of travel of the conveyor so that the grain can be added to and discharged from a pressure cooker without loss of pressure. U.S. Pat. No. 3,807,293 discloses a conveyor type oven having an endless conveyor and trays attached thereto, which are inverted at the ends of the conveyor. Each tray after passing through the oven and upon reaching the end of the conveyor is adapted to pour its contents into a screw conveyor, then the tray is inverted as the conveyor returns under the oven. During their return, the inverted trays are washed and rinsed.

U.S. Pat. No. 3,782,269 discloses a continuous omelet preparing machine which comprises a plurality of forms on which the omelet batter is deposited, cooked and folded and an endless conveyor on which the forms are mounted and moved. After passing through the heating means and following folding, the omelets are discharged and the forms are returned on the endless conveyor by passing underneath the heating device. On their return trip the forms are washed, rinsed and dried.

U.S. Pat. No. 3,223,024 discloses an apparatus for washing and cooking potato chips in a continuous fashion. The apparatus disclosed in this patent utilizes a hot oil bath wherein the oil is withdrawn, reheated, recycled back to the bath while the potato chips on the conveyor belt are caused to move from one end of the bath to the discharge end. The oil is withdrawn from the bath at the discharge end, reheated and returned at the inlet end of the bath resulting in concurrent flow of potato chips and hot oil.

No prior art is currently known to disclose or teach apparatus or method of cooking large quantities of relatively fragile food pieces in a gentle manner on a large scale. No prior art is currently known which utilizes as a means for heating a cooking vessel, a plurality of means along each side of the vessel for withdrawing cooking fluid from it, heating the fluid and returning it to the vessel along the center line thereof. An arrangement such as this provides gentle handling of very fragile food pieces and results in a reduced production of fines. It also permits more precise control of temperature during large scale cooking operations and averts overcooking or under cooking of the food pieces or portions thereof. It allows the establishment of a temperature profile along the length of the cooker. For example, the temperature in those areas where fresh cooking liquid (e.g., hot water) contacts the food pieces can be kept relatively lower than the temperatures in those areas where the cooking liquid contains relatively high amounts of extractables since higher temperatures increase the extraction rate.

SUMMARY OF THE INVENTION

This invention relates to apparatus for continuously cooking and leaching food pieces such as compacted soy bean products with a cooking liquid such as water at an elevated temperature without degrading the food pieces especially when such pieces are fragile. The cooking and leaching are carried out at elevated temperatures in an elongate tank for the liquid. The tank is provided with a product infeed end and a product discharge end. The food pieces travel through the hot liquid in the tank on the upper flight of a driven endless conveyor whose return flight passes beneath the tank where it can be subjected to washing, rinsing, and/or sterilizing. There is also provided a plurality of means along one or both sides of the tank for withdrawing liquid from the tank at spaced apart points along the tank, heating the withdrawn liquid and returning the heated liquid to the tank at a plurality of points adjacent the center line thereof.

The driven endless conveyor conveniently comprises two side-by-side conveyor belts having a space therebetween through which the heated liquid is returned to the tank. The tank can also be provided with a duct extending along and beneath its bottom through which the return flight of the driven endless conveyor passes from the discharge end to the infeed end. In the duct, there can be provided means for rinsing, washing with detergent and/or imposing sterilizing conditions on said conveyor. There also is provided means for impinging steam, hot water and/or chlorine on the conveyor in the duct for sterilizing it, if desired.

In addition, the driven endless conveyor can be inclined at the discharge end portion and sprayers can be provided above the inclined portion for rinsing with a gentle spray or rain of cooking liquid, such as water, the food pieces travelling on the conveyor just prior to their discharge. There can also be provided at least one sump extending transversely across the tank below the sprayers for receiving fines rinsed off of the food pieces by the sprayers. One or more of these sumps can be provided with means for removing the fines therefrom and the sumps can be provided with means for recycling liquid collected in the sump back to the sprayers. The tank also preferably is formed with liquid overflow means at the infeed end to provide a flow of liquid in the tank from the sprayers to the overflow means which is countercurrent to the flow of food pieces through the tank. In addition, the driven endless conveyor can be provided, if desired, with a plurality of wiping means on the underside thereof to wipe the interior bottom of the tank and sweep any fines collecting there to the sump adjacent the inclined discharge end portion.

In a preferred form the tank is also provided with a cover to reduce contamination and can also be provided with means for lifting the cover and the upper flight of the conveyor for the purpose of inspecting and cleaning the cover, the tank and the conveyor. The lifting means can be conveniently mounted on legs which support the tank.

Suitable lifting means comprises jack screws mounted on the cover and driven by an electric motor which is also mounted on the cover. The jack screws operatively engage nuts fixed to the legs supporting the tank. The cover can also be provided with track means on which the upper flight of the endless conveyor rides so that when the cover is raised so is the upper flight. This permits inspection and cleaning of the bottom interior of the tank and the underside of the conveyor. The cover can also be provided with removable product guide means mounted on the underside thereof and extending substantially the full length of the tank along each side of each conveyor for the purpose of maintaining the food pieces on the conveyor as they travel from the infeed end to the discharge end. The guide means are fixed to the undersurface of the cover and project downwardly to a point just above the conveyor. The internal surfaces of the cover are also preferably provided with means for collecting and removing condensate which may form on the internal surface. It is also desirable to provide the cover with an externally flushed fresh water seal on the outboard edges thereof to minimize the escape of moisture. In order to further minimize the escape of moisture, exhaust means can be provided above each end of the tank for collecting and exhausting any escaped moisture.

In addition, the apparatus of this invention can include a vibration feeder for feeding the food pieces onto the driven endless conveyor at the infeed end of the tank. It is also preferable to provide a curtain of cooking liquid gently falling on the food pieces at the infeed end to suppress dust formation. The suppression of foam at the point at which the food pieces enter the liquid in the tank is also preferably provided and such means can utilize steam directed onto the liquid adjacent the area in which the foam forms. The steam can be so directed as to break up the foam and/or urge it towards the overflow provided in the infeed end of the tank. The cover can be provided with sprayers extending for substantially the total length of the tank and such sprayers are useful for spraying liquids on the upper surface of the upper flight of the conveyor for purposes of inspecting and cleaning it at periodical intervals and also for the purpose of applying heating liquids during start-up procedures. The tank is preferably mounted on a plurality of rollers to accommodate thermal expansion and contraction when the tank is heated during start-up and cooled after operations for maintenance and cleaning. The duct under the tank and the cover over the tank are preferably provided with plenty of access doors to permit inspection and cleaning of the interior and contents of the duct, conveyor and tank. Other features and alternatives which can be employed in the present invention will be apparent from the appended drawings and the detailed description given hereinafter.

BRIEF DESCRIPTION OF THE DRAWINGS

FIG. 1 is a block diagram representing the various sections of a cooker of this invention;

FIG. 2 is a schematic diagram generally corresponding to a side elevation illustrating the elongate tank, the driven endless conveyor, and the infeed and discharge of food pieces;

FIGS. 3A, 3B and 3C taken together comprise a side elevation partly broken away of the cooker of this invention;

FIG. 3A is a side elevation showing the hopper and uncooked food piece infeed section;

FIG. 3B is a side elevation of the tank intermediate sections and the first two rinse sections;

FIG. 3C is a side elevation of the last two rinse sections and the cooked food piece discharge section;

FIG. 4 is a schematic diagram illustrating a transverse cross section through an intermediate section of the cooker;

FIG. 5 is a schematic diagram as a plan view illustrating the flow pattern of liquids in an intermediate section in the cooker;

FIGS. 7A, 7B and 7C taken together comprise a process flow diagram in side elevation partly broken away, illustrating the flow of materials in the continuous cooker and rinsing, cleaning and sterilizing equipment;

FIG. 7A illustrates the food piece infeed section and a tank intermediate section;

FIG. 7B illustrates a tank intermediate section and the first two rinse sections;

FIG. 7C illustrates the last two rinse sections;

FIG. 8 is a flow diagram illustrating another slightly modified rinse system;

FIG. 9 is a diagram illustrating a cross-section of a rain trough or sprayer used in the rinse sections of the embodiment shown in FIG. 8;

FIGS. 10A, B and C taken together comprise a side elevation partly broken away of the continuous cooker illustrating in more detail the mechanism for raising the cover;

FIG. 10A illustrates the raising mechanism along a portion of the infeed section as well as a tank intermediate section;

FIG. 10B illustrates the raising mechanism along the rinse sections;

FIG. 10C illustrates the raising mechanism along those portions between the rinse sections and the discharge section;

FIG. 11 is a section on line 11—11 of FIG. 10C;

FIG. 12 is a section on line 12—12 of FIG. 10B;

FIG. 15 is a transverse cross-sectional view through an intermediate section of the cooker, similar to FIG. 6 but partly broken away.

DESCRIPTION OF SPECIFIC EMBODIMENTS

Figure 3C:
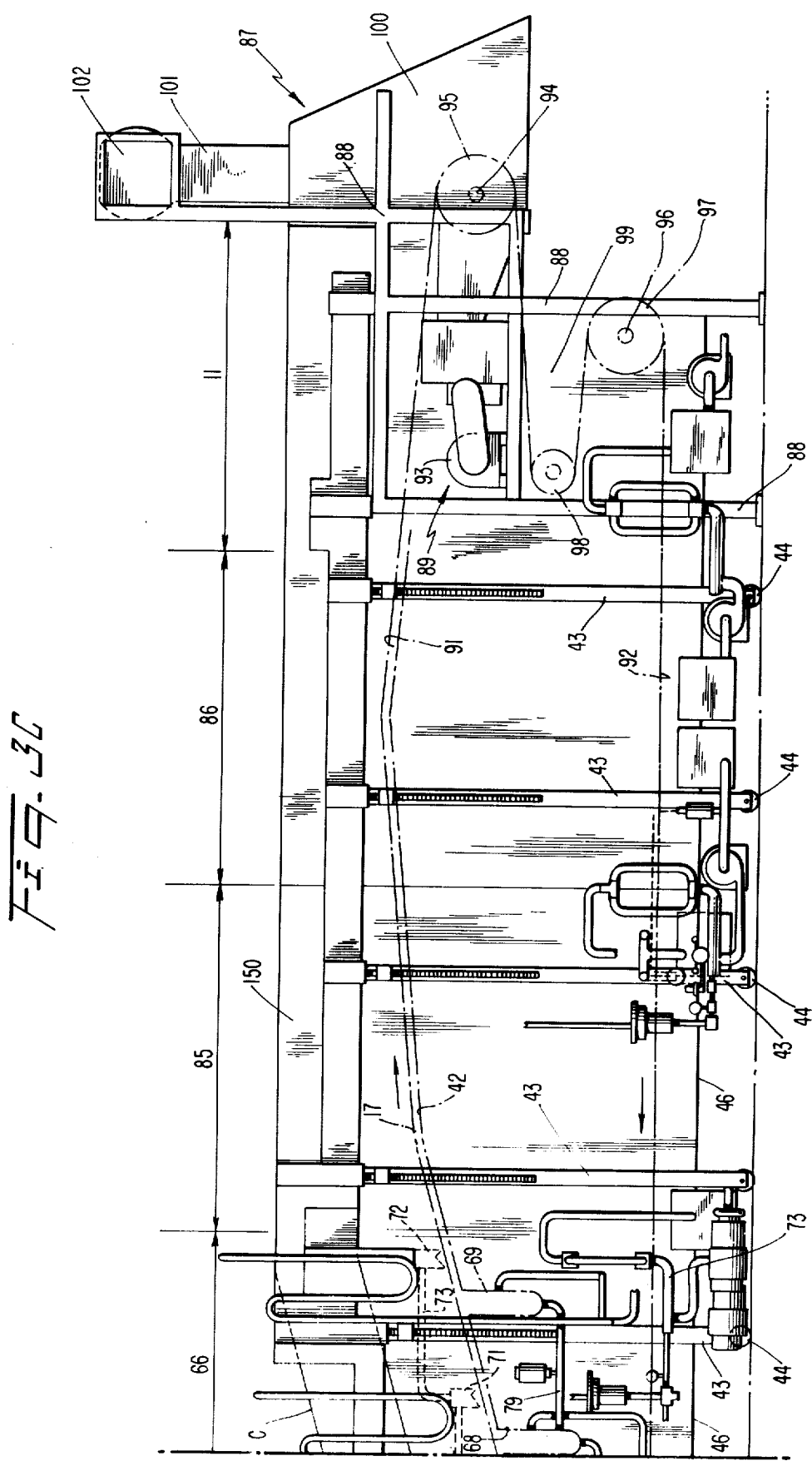

Referring to FIGS. 1 and 2, a preferred specific embodiment of the apparatus of the present invention is shown schematically. Hopper 1 is provided for storing and feeding food pieces to an infeed section 2 wherein the food pieces are distributed evenly on a driven endless conveyor 3. The conveyor 3 enters tank 4 at the tank infeed section 5 and travels through the tank to the discharge end 6 of the tank. The tank 4 is inclined at the infeed section 5 and also is inclined just prior to the discharge end 6. After the tank infeed section there are several tank intermediate sections 7 which are substantially identical to each other as will be described in more detail hereinafter. Rinse and drain sections 8 are provided at the inclined portion of the tank 4 near its discharge end 6. A cooking liquid fills the tank and is discharged through an overflow 9 provided in the tank near its infeed section 5. Make-up cooking liquid enters the tank at the rinse and drain sections 8 so that the cooking liquid flows from the discharge end 6 towards the infeed section 5 of the tank. One or more sumps 10 are provided in the inclined portion adjacent the discharge end of the tank for the collection and removal of fines. FIG. 2 illustrates generally the increase in size of uncooked food pieces as they travel through the tank from the infeed section 5 to the discharge section 11.

Referring to FIG. 3A the hopper 1 is shown as receiving food pieces from infeed conveyor 12. The present apparatus and method is useful for leaching or cooking any food pieces, such as, rice, bulgar wheat, cracked wheat, compacted deoiled proteinaceous vegetable materials and is useful for the blanching of delicate fruits and vegetables. The apparatus and methods of the present invention are particularly well suited for the cooking or leaching of chunks or pieces of compacted proteinaceous feed, such as compacted extracted meal, grits and flakes of proteinaceous vegetable material, such as soy beans. As an illustration, the apparatus and method of this invention are particularly suited for those portions of the method described and claimed in U.S. patent application Ser. No. 485,616 by Albert Spiel (not U.S. Pat. No. 3,912,824) involving the heating of compacted deoiled proteinaceous chunks or pieces under atmospheric pressure in hot water to hydrate the chunks and dissolve out soluble constituents followed by separating the chunks from the water containing the dissolved out soluble constituents. Thus, the infeed conveyor 12 would convey compacted soy chunks, for example, from the compactor or from a conveyance which moves the chunks from the compactor to the infeed conveyor 12 from which they are delivered into the hopper 1. Nonetheless, the apparatus and method of this invention can be used for cooking or leaching any food materials and is especially suited for processing food pieces that are fragile in nature.

The food piece infeed section 2 comprises a vibration feeder 13 which utilizes a plurality of vibrators 14. The vibration feeder 13 including the vibrators 14 are commercially available, for example, as the Syntron wide pan vibratory feeders. The vibration feeder 13 delivers the food pieces from the hopper 1 onto the driven endless conveyor 3. Adjustable levelling gates 15 extend transversely across the endless conveyor and are adjustable upwards away from the conveyor 3 and downwards towards the conveyor 3 for the purpose of helping to spread the food pieces at a substantially uniform height across the width of the conveyor. Two or more such gates can be used, if desired. The hopper 1 and vibration feeder 13 and vibrators are mounted on a frame F. The hopper 1 is provided with level detectors (not shown) to sense the high and low levels of food pieces in the hopper 1 and to provide an appropriate signal so that more material can be added when the level is low and addition of material should be stopped when the level is high. The endless conveyor 3 comprises two side-by-side stainless steel wire mesh belts 16, 17 which are driven by common shafts at each end of the apparatus.

The product-infeed section 2 comprises a frame 16 which houses the main drive take-up unit 19 and fixed tracks 20 and 21 for the upper and lower belt runs, respectively. The main drive consists of an electric motor 22 which drives a head shaft 23 through cone drive double reducer 24. The head shaft 23 is common to both mesh belts and includes four sprockets 25, two sprockets driving each mesh belt. A tail shaft 26 with two sprockets, one guiding each mesh belt 17, 18 is rotatably mounted in a fixed location above the head shaft 23.

The mesh belt take-up 19 is a spring-type unit. Two springs (not shown) are utilized, one on each end bearing (not shown) of the take-up shaft. The end bearings slide in a steel frame with a total travel of 18 inches. A total force of 1,400 pounds can be exerted on the mesh belt when the springs are solidly compressed. The position of the take-up shaft 19 is adjusted by means of two ball screws (not shown), one on each end of the shaft 19. The ball screws are connected by a cross shaft driven by a hand crank (not shown).

A trough 27 with holes 28 in the bottom is positioned above and across the mesh belts 17, 18 at the product infeed point. Water fed into the trough 27 falls through the holes 28 and forms a water curtain which prevents product dust (raised when the food pieces drop onto the belts 17, 18) from escaping out into the plant atmosphere. Vapor-tight stainless steel covers 38 completely enclose the product-infeed section. Water vapor is drawn from this section through an exhaust duct 39 by a blower 40. The duct 39 includes a movable damper (not shown) by which air-flow adjustments can be made as desired.

The inclined tank infeed section 5 of the cooker comprises a stainless steel tank 42 supported by four square tubular legs 43 which also support the mesh belt return-run track 21 (best shown in FIG. 6) for the return run of the mesh belts 17, 18. Tubular legs 43 are equipped with rollers 44 to allow movement of the section 5 when the conveyor is heated and expands. An expansion joint (not shown) at the infeed end of the section is also provided. Removable vapor-tight inspection doors 45 (FIG. 3A) with quick-release latches (not shown) are positioned between the tank and the belt-return track on both sides of the section. Vapor-tight drain panels 46 with quick-release latches (not shown) are located under the return run of the belts 17, 18, are pivoted on the centerline of tank 42 and completely enclose the underside of the section. The tank 42 is provided with a liquor discharge trough 47 extending across said tank near its infeed end. An adjustable weir 48 at the discharge trough 47 can be used to control the depth of water in the tank 42. A manifold 49 across the mesh belts is located in the cover 150 in the inclined section. Nozzles 50 in the manifold 49 are directed across the belt 17, 18 toward the spent-liquor discharge trough 47. Steam is supplied to the manifold 49 through the nozzles 50 and on to the point where the product enters the cooking water. This is the point at which foam is most likely to be generated. The steam disperses the foam and forces it toward and over the level-control weir 48 into discharge trough 47.

Several, e.g., ten, intermediate sections 7 (FIG. 3B) are used in the complete continuous cooker. Each section is fabricated from stainless steel sheets. The total length of the assembled intermediate sections can be approximately 100 feet. Each tank section 42 is supported by four square tubular legs 43. The legs 43 also support the belt return run tracks 21 and are equipped with rollers 44 to allow the section to move as the cooker expands or contracts.

As best shown in FIGS. 4 and 5, in the center of each intermediate section 7 the bottom of the tank 42 is formed into a plenum chamber 52 which provides the inlet to said tank for the recirculated cook-water. Recirculating water is pulled from the same intermediate section 7 over a fixed weir 53 and through water boxes 54 located on opposite sides of the tank 42. The cookwater recirculating system consists of a recirculating pump 55, eductor 56, steam valve 57, and sanitary piping 58. A three-way valve in the plenum 52 of this system provides a means of draining the tank 42. All piping is easily disassembled for cleaning and inspection. Each water box 54 is equipped with a screen 59 to remove fines and other materials and prevent them from recirculating and a temperature sensor 60 for sensing the temperature of liquor in the water box. Each temperature sensor feeds signals to a temperature controller 61 which controls steam valve 57 to increase or decrease the amount of steam (i.e. heat) introduced into the system through eductor 56.

The plurality of individual recirculating and heating units (i.e., each unit comprising the weir 53, water box 54, pump 55, eductor 56, steam valve 57 and sanitary piping 58) ensure the maintenance of a uniform temperature along the length of the tank 42 while providing the gentlest treatment to the food pieces on the conveyor. The units also are used to establish a temperature profile along the length of the cooking tank 42 that can be advantageous to the cooking process. Extraction or cooking rates depend upon temperature and concentration. During cooking, the concentration of the extracted material in the cooking liquor increases which can cause a slowing down of the extraction rate. At the point increasing temperature can be used to increase the extraction rate. The concentration of extracted materials is low in the rinse and drain sections 8 of the tank 42 where fresh cook-water make-up is added and is very high at the tank infeed section 5 where the cook-water is discharged at the liquid overflow 9. The extraction rate can be higher at a lower temperature at the rinse and drain section of tank 42 than at the liquid overflow 9. This indicates the usefulness of the units to match the extraction process in an economical manner. In other words, a declining temperature profile can be established along the length of the cooker beginning at the overflow 9.

Figure 6:
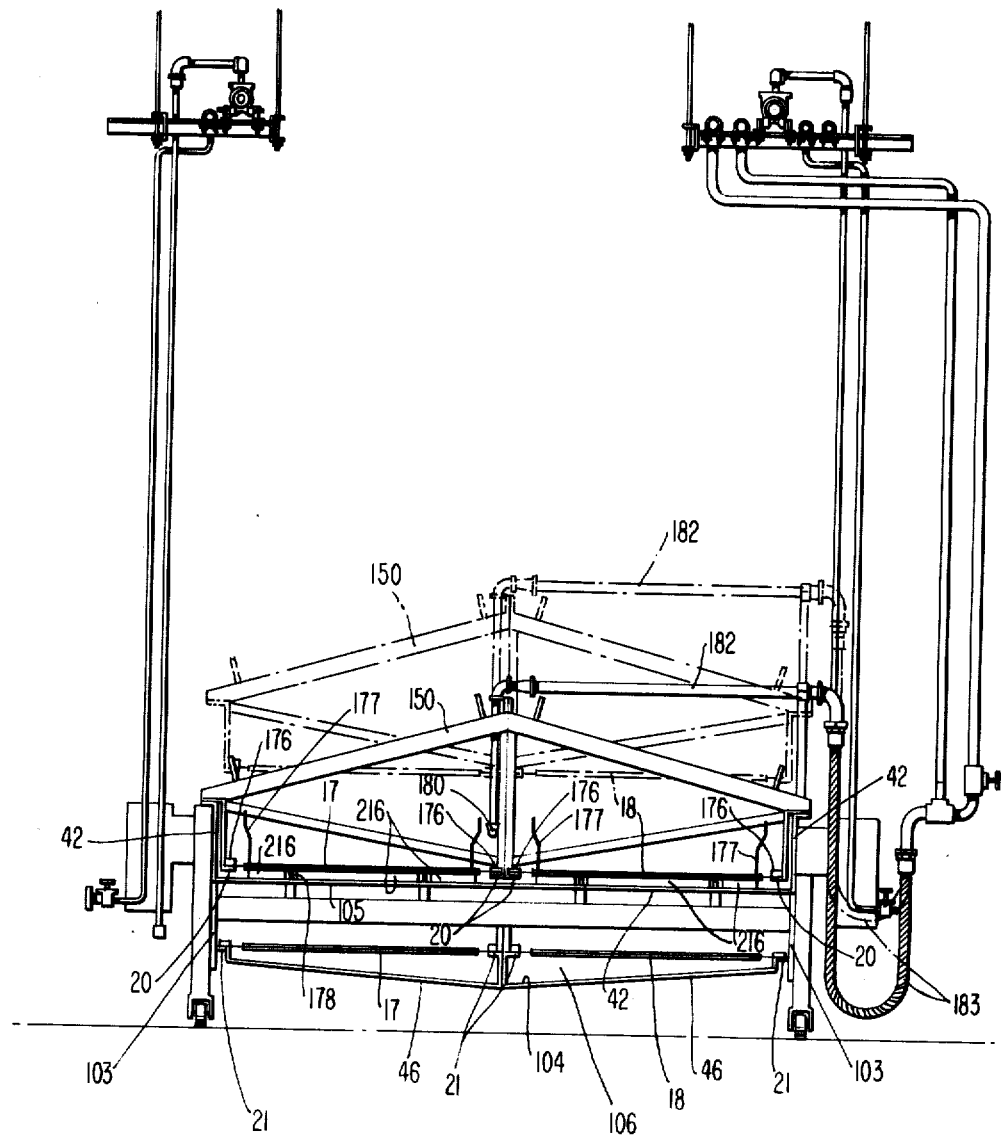
FIG. 6 is a transverse cross-sectional view through an intermediate section of the cooker.

Four removable inspection panels 45 equipped with quick-release latches are located between the tank section 42 and the mesh belts-return-run track 21 on each side of each intermediate section 51. Six drain panels 46 are positioned beneath the return-run of the belts 18, 19 and pivoted on the centerline of the tank 42. The panels 46 are best shown in FIG. 6. These panels 46 are also equipped with quick-release latches so that the outside edges of the panels may be dropped to the floor for cleaning and inspecting the underside of the belts return-run.

The first inclined rinse section 62 (FIG. 3B) at the discharge end of the cooker is fabricated from stainless steel sheeting. The tank 42 is supported by four square tubular legs 43 which are not supported by rollers. The legs also support the mesh-belt-return-run tracks 21. A transverse sump 63 is formed in the bottom of tank 42 running from side to side. The sump is sloped at 15 degrees from one side to the other and projects outside the tank at its lower end. Two screw conveyors are located at the lower end of the incline in this section. One screw conveyor 64 runs in the transverse sump 63 in the bottom of the tank 42. The second screw conveyor is positioned beneath the lower end of the transverse sump 63 projection and runs alongside the tank 42 at an upward angle of 15 degrees. The first conveyor 64 moves fines and other materials that have collected in the sump 63 to the side of the sump where the second screw conveyor picks them up and dewaters same thereby removing said fines and other materials from the tank 42. A transverse rain trough 65 having a plurality of holes in its bottom is supported by cover 150 and is positioned across and above the belts 17, 18. It provides rinse water for the product carried on the belts. Four removable doors 45, two on each side of the cooker, provide access to the underside of the tank 42 and the lower surface of the mesh belts 17, 18. Drain panels 46, pivoted on the center line of the section 62, can be lowered to the floor for inspection and cleaning.

The second inclined rinse section 66 is constructed from stainless steel sheet and includes a section of tank 42 which is supported by four tubular legs 43, equipped with rollers 44, which also provide support for the belt-return tracks 21. Three transverse sumps 67, 68 and 69 are formed in the bottom of the tank 42. Three rain troughs 70, 71, 72 each with a number of holes in the bottom are positioned across the belts 17, 18 and above the product on the belts. The rain troughs 70, 71, 72 are supported by the overhead cover 150 of this section. The three rain troughs 70, 71, 72 are interconnected by overflow conduits 73 wherein the overflow of liquid from the next higher trough runs into the next lower trough. The external piping system (see FIGS. 10B and 10C) of the section consists of eductors 74, throttling valves 75, steam valves 76, and a flowmeter 77. All piping 78 is sanitary and is easily disassembled for cleaning and inspection. Pipes 79 connect the bottoms of the lower-most ends of each sump 72, 71 and 70 to the next lowest sump 71, 70, 69, respectively, to move fines down to the lower-most sump 69. Solenoid valves 80A, B and C with timers operate valves 84A, B and C, respectively, to control the amount of liquor flowing in pipes 79 as more fully explained hereinafter. Pipe 81 carries liquor from the lower-most end of sump 63 to discharge. Side covers are provided for easy access to the underside of the tank 42 and the underside of the mesh belts 17, 18. Drain panels 46, beneath the center of the section, can be lowered to the floor at the outside edges for cleaning and inspection. Temperature controllers 82 are provided in the second and third sumps 67 and 68 to control the amount of steam introduced into the liquor entering the rain troughs 70 and 71, respectively.

The section of tank 42 located at first drain section 85 is formed from stainless steel sheet and is supported by four tubular legs 43, equipped with rollers 44. The return-run tracks 21 are also attached to the tubular legs.

The section of tank 42 located at the second drain section 86 is constructed from stainless steel sheet and is supported by four square tubular legs 43. The legs also support the belt-return-run tracks 21 and are equipped with rollers 44 which allow the section to move as the cooker expands.

The product-discharge section 11 includes a frame 88 fabricated from tubular steel, as best seen in FIG. 3C. The section houses the main drive 89, take-up unit 90 and fixed tracks 91, 92, respectively, for the upper and lower runs of the mesh belts 17, 18. The main drive 89 consists of an electric motor 93 which drives a head shaft 94 through a dog clutch and a cone drive double reducer. The dog clutch consists of a movable dog which can operate in either of two driving modes. The normal mode is the mesh-belt drive mode. The second mode is the belt-reversing-slackening mode, used when the cover 150 and belts 17, 18 are being raised for cleaning. The head shaft 94 is common to both mesh belts 17, 18 and contains four sprockets 95, two sprockets driving each mesh belt. A tail shaft 96 with two sprockets 97, on guiding each mesh belt, is in a fixed location beneath the head shaft 94.

A mesh-belt take-up shaft 98 of the spring-type is provided between the head shaft 94 and the tail. Two springs are utilized, one on each end bearing of the take-up shaft. The end bearings slide in a steel frame with a total travel of about 18 inches. A total force of 1,400 pounds can be exerted on the mesh belt 16, 17 when both springs are solidly compressed. The position of the take-up shaft 98 is adjusted by means of two ball screws, one on each end of the shaft. The ball screws are connected by a cross shaft and right-angle drive units. Both ball screws are moved the same distance by rotating the cross shaft with a hand crank and thus provide for adjustment of tension in belts 17, 18 and provide for slackening the belts enabling the upper flight to be raised with cover 150.

Vapor-tight stainless steel covers 99 completely enclose the product-discharge section. The covers 99 are equipped with quick-release latches and are easily removed for cleaning and inspection. Water vapor is drawn from an exhaust hood 100 which covers the product discharge area 87 through an exhaust duct 101 by an exhaust fan 102. The duct 101 includes a movable damper (not shown) by which air flow through the duct can be adjusted.

As best illustrated in FIG. 6, the sections 2, 5, 7, 62, 66, 85, 86 and 11 comprise side walls 103, and bottom walls 104 which together with the bottom wall 105 of tank 42 form a duct 106 extending the full length of the cooker. The belts 17, 18 travel in the duct 106 during their return to the infeed section 2 and various washing, rinsing, cleaning and/or sterilizing operations are performed on the belts as they travel through duct 106. The duct 106 is essentially closed at each end except for an opening at the infeed section 2 to expose the belts 17, 18 to pick-up food pieces from the feeder 13 and to permit said belts to enter the tank 42 and except for an opening at the discharge section to permit the belts to unload and re-enter the duct 106. As previously noted, the side walls 103 on both sides of each section are provided with access doors 45 and the bottom walls 104 thereof are provided with drain panels 46 to permit access to the interior of the duct 106 for inspection, cleaning and repair.

The washing, rinsing, cleaning and/or sterilizing means included in duct 106 are best shown in FIGS. 7A, B and C and comprise the following stations, at appropriate locations along the return path of the belts 17,18: prerinse 107, detergent wash 108, rinse 109, heating 110 and sterilizing 111. Removal of residual product particles is accomplished in the first three stations that is in the prerinse 107, detergent wash 108 and rinse 109 stations. The heating station 110 extends from the rinse station 109 to the sterilizing station 111. Steam is fed continuously into the belt-return duct in the heating station 110 to maintain temperatures of the belts 17, 18 high enough to prevent biological growth on the belts after they have been washed and rinsed. Sterilization is continuously accomplished in the sterilizing station 111 during cooking operations by the superheated steam purge and hot water rinse. However, during shutdowns, the same station 111 may be used to spray the belt with hot water or with cool chlorinated water.

A high-pressure hot water mesh-belt rinse system is included in station 107. Manifolds 112 equipped with nozzles 113 are positioned above and below the belts 17, 18. A recirculation tank 114 is located beneath the manifolds. A pump 115, eductors 116, valves 117, pump 118, a hot water reservoir 119 and sanitary piping 120 are utilized to heat and recirculate the rinse water. A recirculation tank 114 and the hot water reservoir 119 are equipped with water level controllers 121 which control low water cut-off switches 122 which regulate incoming and outgoing water through pump 118 and valves 117 to maintain an appropriate water level in tank 114 and reservoir 119. A temperature sensor 123 regulates steam valve 117 which regulates the amount of steam injected into eductor 116 and thence through manifolds 112 and nozzles 113. Spent rinse water is pumped from the tank 114 to a filter to recover fines.

The detergent rinse-wash system at station 108 utilizes two tanks 124A and 124B (reservoir) of detergent solution and three spray manifolds 125 and nozzles 126. The manifolds 125 are located two above and one below the belts 17, 18. A pump 127, an eductor 128, valves 129 and steam control valve 130 are used to reheat and recirculate the detergent onto and through the mesh belts 17, 18. The detergent tans 124A and B are equipped with water level controllers 131 which control valves 129 and pump 127 via low water cut off switch 132 to maintain an appropriate water level in tanks 124A and B. A temperature sensor 133 regulates steam control valve 130 which regulates the amount of steam injected into the eductor and thence through manifolds 125 and nozzles 126. Valve 134 and pipe 135 are provided to conduct, when desired, detergent solution to the clean-in-place sprayers which are more fully described hereinbelow.

The rinse system at station 109 includes a recirculation tank 136 and two manifolds 137 having nozzles 138 extending across the belts 17, 18 above and below same. Two pumps 139A and 139B, an eductor 140, valves 141, a water level controller 142, a temperature controller 143, and a steam control valve 144 are used to heat and recirculate the rinse water onto and through the mesh belts 17, 18. The steam control valve 144 is controlled by temperature sensor 145. Pumps 139A and B are controlled by low water cutoff switch 146 which is controlled by the water level controller 142. Valve 141 controls the amount of water entering tank 136 and is controlled by level controller 142.

To ensure the cleanliness of the conveyor belts 17, 18 immediately prior to the product-loading point at section 2, sterilizing station 111 is provided and includes a manifold 193 located over the return-run of the mesh belts 17, 18. The manifold 193 contains high-pressure nozzles 194 and is supplied high-pressure steam (e.g. 600 p.s.i.) from a steam generator (not shown). A pressure-reducing valve 195 in the high-pressure steam supply line 196 supplies the superheated steam to the manifold 193, from which it is directed onto the mesh belts 17, 18 by the nozzles 194. A recirculation pump 197, valve 198, and piping arrangement 199 are also located in this area. All piping is sanitary and can easily be disassembled for cleaning and inspection. The superheated steam manifold 193 may also be used to deliver cold chlorinated water when the cooker is being taken out of production, or hot water when resuming production. Valve 200 is provided in steam line 196 to shut off the steam when it is desired to pass chlorinated water or hot water through manifold 193 and nozzles 194, in which event valves 198 should be opened. The liquid falling through the wire mesh belts 17, 18 is collected in vessel 201 equipped with a liquid level detector 202 which controls operation of the pump 197 to operate same when the liquid is at or above a predetermined level and to cut it off when the liquid is at or below a predetermined lower level. The liquid from pump 197 is sent to station 109 of the apparatus for use in washing the belts 17, 18 on their return flight. Each of the vessels 114, 119, 124A and B, 136 and 201 are equipped with a drain valve 203 which is used when emptying, cleaning and flushing the cooker. During operation of the cooker the valves 203 are kept closed.

Figure 14:
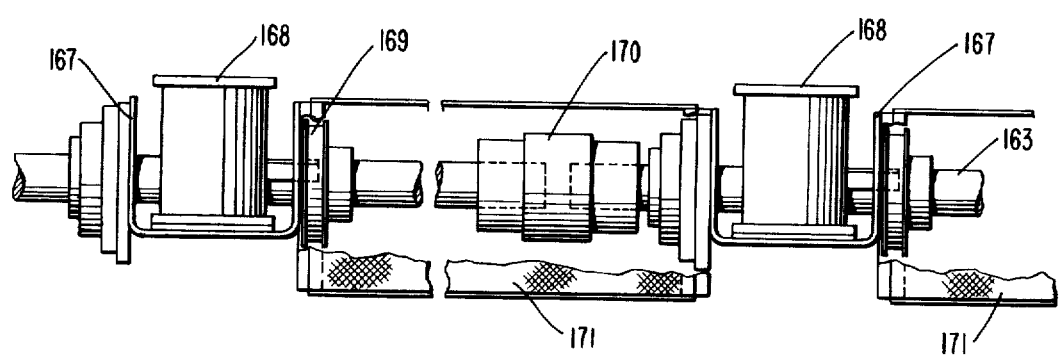
FIG. 14 is a section on line 14—14 of FIGS. 10B and 10C.

As previously mentioned, the entire tank 42 is covered with a cover 150 which is equipped with a hoisting mechanism which comprises four screw jacks for each section. Each screw jack comprises a nut 151 attached to each leg 43 and a jack screw 152 threadedly engaging a nut 151 and attached to the cover at a point just above the nut 151 it engages. Two horizontal line shafts 153 are located on each side of the cover 150 and extend from the tank infeed section 5 to the first inclined rinse section 62. Each line shaft 153 at its end adjacent the tank infeed section 5 is drivably connected by means of pulley arrangement 154 to two line shafts 155 one on each side of the cover 150. The end of each line shaft 153 adjacent the first inclined rinse section is drivably connected by means of pulley arrangement to line shafts 157, one on each side of the cover 150, and which extend to second inclined section 66 where they are drivably connected by means of pulley arrangement 158 to line shafts 159 located on each side of the cover 150. Each line shaft 159 is drivably connected at its end closest to the first drain section 85 by means of pulley arrangement 160 to line shafts 161 on each side of the cover 150. The line shafts 161 extend for a short distance between the second rinse section 66 and the first drain section 85 and are drivably connected by means of pulley arrangement 162 to line shaft 163 which extend along each side of the cover at sections 85 and 86 and end adjacent discharge section 11. The line shafts are connected by means of pulley arrangement 164 to line shafts 165 extending on each side of the cover 150 along discharge section 11. At the appropriate positions along the cooker, line shafts 153, 155, 157, 159, 161, 163 and 165 drive the jack screws 162 through reduction gear boxes 166. FIG. 14 illustrates the screw drive assembly 167 and also shows the bracket 168 by which the jack screws 152 are attached to the cover. A timing belt 169 is also provided in FIG. 14 shows a coupling 170. A housing 171 encloses all line shafts and pulleys.

Figure 13:
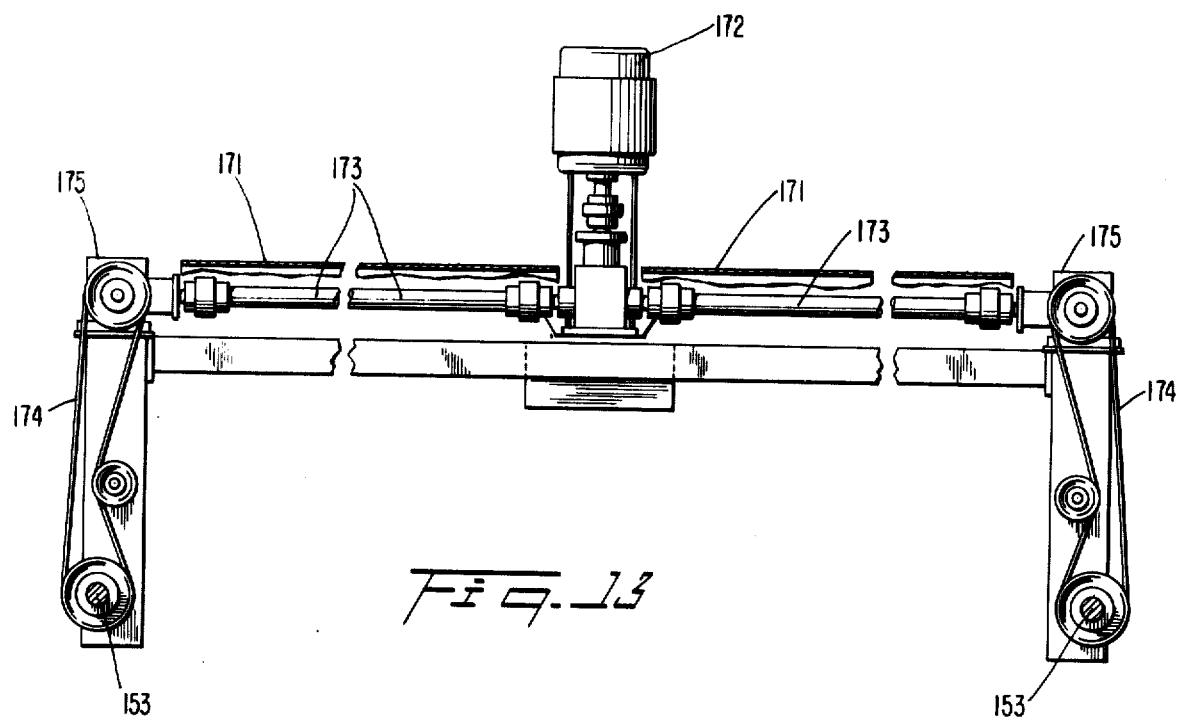
FIG. 13 is a section on line 13—13 of FIG. 10A.

FIG. 13 illustrates motor 172 which drives drive shafts 173 which extend to each side of the cooker where they drive pulleys 174 through gear box 175. The pulleys 174 drive the line shafts 153 which ultimately turn all the jack screws 152 to raise or lower the cover. A protective housing 171 encloses the drive shafts and pulleys.

As best shown in FIGS. 4 and 6, the cover 150 is provided with four fixed tracks 20 extending the entire length of the cover. The mesh belts 17 and 18 are preferably formed with roller chains 176 along each edge thereof. The rollers of the roller chains 176 engage the fixed tracks 20; thus, the upper, flights of the belts 17 and 18 are supported by the cover 150 and move upwardly and downwardly when the cover 150 is so moved. Also fixed to the underside of the cover are perforated product guides 177. The product guides extend downwardly to the surface of the belt and serve to keep the food pieces on the belt. It is also noted that the bottom of the tank 42 is provided with support guides 178 for supporting the belt as it travels through the tank.

FIG. 6 illustrates the plumbing arrangement for the cleaning-in-place sprayer system. This system is best shown in FIGS. 7A and B taken in conjunction with FIG. 6 as a pipe 180 which is supported under the cover 150 and which extends from the approximate beginning of the tank infeed section 5 to the last intermediate section 7 just prior to the first drain section 85. The pipe 180 is provided with a plurality of spray nozzles 181 that are designed to spray the entire width of the belts 17 and 18 in the sections 5 and 7. The pipe 180 is fed by pipe 182 which is connected to flexible hose 183 of a suitable length to accommodate the raising and lowering of the cover 150. The flexible hose 183 is connected to piping which leads to detergent tank 124A through pipe 135 and valve 134. It also is connected to steam heater 184 through a common valve 185 and a hot water valve 186. The steam heater 184 is connected to a fresh water supply through pipe 187 and is connected to a source of steam through pipe 188. In addition, pipe 187 supplies fresh water to a chlorinator 190 which is adapted to supply chlorinated water through valve 191 to the clean-in-place spray nozzles 181. It also is adapted to provide chlorinated water through valve 192 to vessel 201 which can then be used to supply manifold 193 and nozzles 194 with cold chlorinated water for purposes of disinfecting the belts 17, 18. It is also possible to transmit the chlorinated water to vessels 136, 124B, 119 and 114. The same can be done with hot water from steam heater 184. The chlorinated water or hot water can also be passed through valves 185 and 175 to rain trough 72 for disinfecting or washing the upper flight of the belt in the rinse and drain sections. Steam supply line 188 also supplies steam through steam line 204 and headers 205 to the eductors 56 at the intermediate sections 7 of the cooker. The antifoam manifold 49 is also supplied by steam through steam lines 188 and 204 and a header 206. A temperature controller 207 is provided in the steam manifold 49 and operates valve 208 to control the temperature of the steam at an appropriate level. Water for the dust suppression curtain trough 27 is tapped through line 209 from the hot water recirculation system of the first intermediate section 7. A thermal steam trap 210 and a float trap 211 are provided at the end of steam line 204.

A preferred rain trough and sump arrangement is shown in FIGS. 8 and 9. FIG. 9 illustrates a rain trough 212 which has a cross-sectional configuration in the form of a W. A plurality of holes 213 are provided through the bottoms of each of the small troughs 214 of the W configuration. The holes run for the full distance across the width of the belts 17 and 18 and the holes in one small trough 214 are off-set from the holes in the other small trough 214. A removable mesh wire screen 215 is provided in the rain troughs 212 so as to prevent return of fines to the food pieces travelling on the belts 17 and 18. The utilization of rain troughs 212 of the type shown in FIG. 9 is given in FIG. 8 which illustrates a somewhat more simplified version of the rinse and drain sections previously described.

Figure 7B:
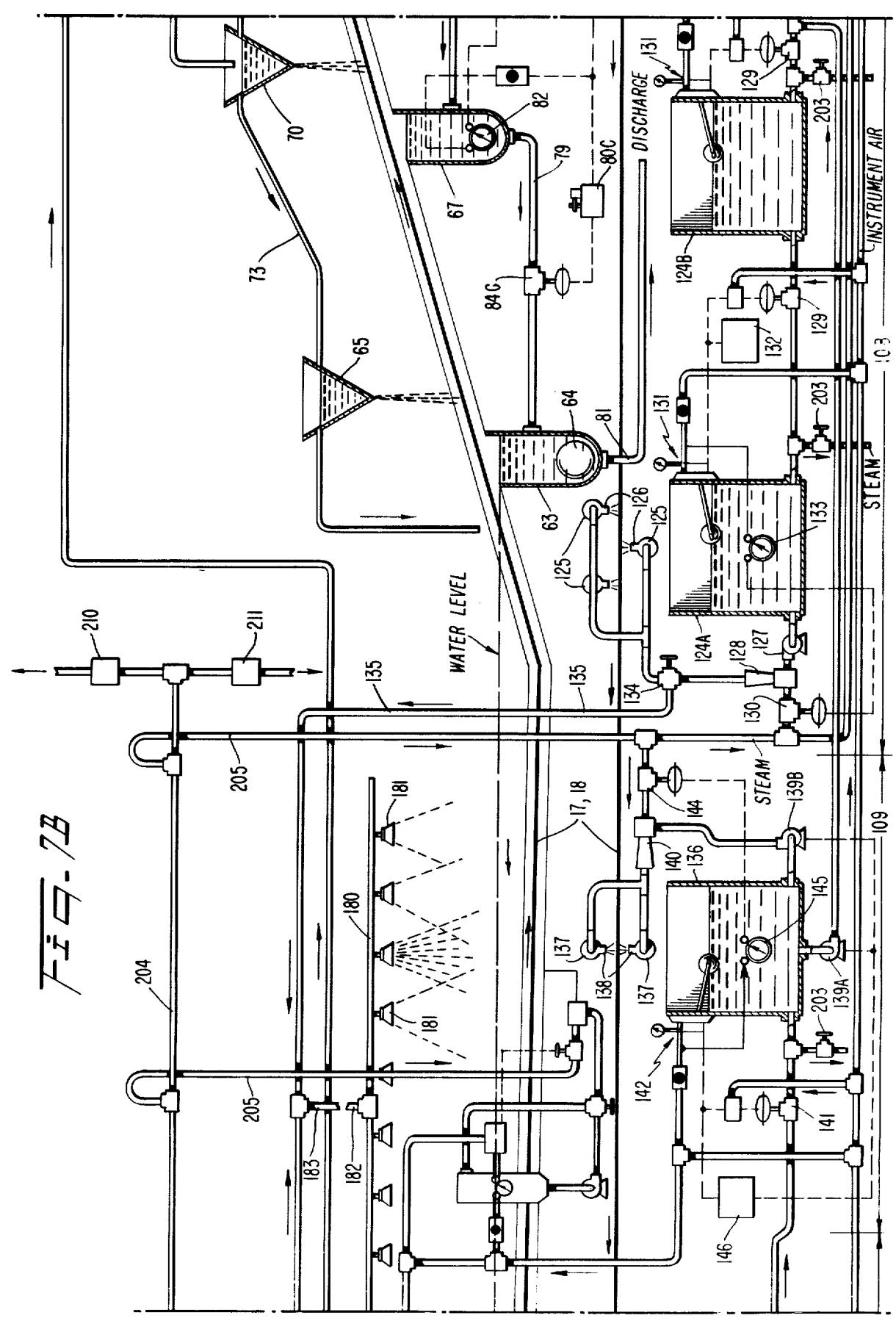

The system shown in FIG. 8 utilizes a simple temperature controller 82 in the sump 67 and a single steam valve 76 for heating recycle water to rain troughs 70 and 71. The fines flush system can be the same as that described hereinbefore and as shown in FIGS. 7B and C. Also, given in FIG. 8 are representative flow rates in the system.

In operation, the food product which may be granular is supplied to the cooker from a product feed and sizing area. It is conveyed to the cooker and distributed evenly in the hopper 1 by means of the oscillating conveyor 12. This unit is mounted on a separate frame at the input end and is independently controlled. The food product is fed to the cooker by the dual feeder 13. Both elements of the feeder 13 are fed from the common hopper 1 located above the feeders in the product-infeed section. Each element of the feeder 13 consists of, for example, a bank of five individually adjustable vibrators mounted on a common frame, with a single master control for all five. The function of the feeder is to spread a uniform layer of food product of a given thickness, e.g., approximately 1½ inches thick, on the cooker conveyor belts 17, 18.

Special features of the feeder 13 include a fines-removal screen on the discharge lip of the vibrators 14 to avoid loss of dry fines into the outgoing cook liquor and a dust-removal water curtain at the feeder discharge to wet the food product and wash any dust remaining thereon into the cook liquor to prevent escape into the room. Two adjustable height gauges 15 are provided downstream of the water curtain, to smooth out any irregularities in the food product layer after it is spread on belts 17, 18. An exhaust fan 40 is provided to remove any dust escaping from the system despite the above-mentioned provisions.

Cook liquor leaves the cooker from an adjustable overflow weir 48 in the inlet slope section 5. The cook liquor attains maximum concentration of extracted materials at about this point due to the counterflow arrangement described therein. In the case of a dry food product such as the compacted de-oiled soy chunks mentioned hereinabove, the wetting of the incoming dry food product by concentrated cook water in the cooker provides a big boost in concentration in the first few cooking sections, because water is extracted from the cook liquor in the wetting of the product. As the product moves through the cooker, it gradually absorbs more water, then it loses some of the weight of its solids to the cook water. Overall, the volume of the chunks increases, for example, by a factor of about 2.75 due to absorption of water. Thus, the product leaving the outlet slope of the cook section is in a swollen and leached condition, and about 65 to 70 percent of its weight is water.

As explained above, the heating system consists of several, e.g. 20, individual direct-contact heating and circulating units in the intermediate sections 7 with individual controls on each system (FIGS. 4 and 5 especially) and provisions for fines removal at each pump suction at 59. The flow and circulation patterns are indicated in FIGS. 4 and 5. Cook liquor is recirculated transversely to the direction of product movement at a flow rate of approximately 70 gallons per minute, for example, with a heat make-up of approximately 100 pounds of steam per hour in each heater. The heated water (near boiling) is introduced via plenum 52 at the center of the cooker section and distributed uniformly over the section by orifice-slits formed between the top of the plenum 57 and the bottom of the chain support guide 20. The perforations in the product guides 177 at the edges of the conveyor belts 17, 18 also act as distribution orifices for the circulating system. Part of the heated water passes under the belts 17 and 18 and part passes above the belt or through the product bed, depending on the relative volume occupied by the product at various stages during the cooking process. After passing through the product bed, the cook water is collected in channels on the outboard side of the product guides 177 and is redirected to the pumps 55. Any fines entrained in the circulating water are collected in removable strainers 59 at each pump suction.

The temperature of the circulating cook water is maintained at the desired level by expansion-stem temperature controllers 61 which regulate the rate of injection of steam to the cook water injector heaters of eductors 56. The controllers 61 are non-indicating; however, reference thermometers (not shown) are provided at each control station. Each controller graduation is equivalent to 1.5° F. and once the set point has been established no further adjustment should be required. However, a change in air supply pressure will cause an offset in controller set point; thus, a fixed air supply reference pressure of 20 to 25 p.s.i.g. should be established and maintained at ±½ p.s.i. of the reference value on all controllers 61.

The product-rinse and drain sections 62, 66 provide a cascading, four-stage countercurrent rinse for the product. Incoming hot, fresh water is used for the final product rinse via a cascade system of rain troughs 65, 70, 71 and 72, extending across the cooker conveyor inside the cover 150 approximately 3 inches, for example, above the product. Rinse water is distributed over the product via small diameter (e.g. 3/32-inch) holes in the bottom of said rain troughs. The size of the holes determines the maximum flow rates from the troughs. The rinse water from the final rinse passes downward through the product bed to the first rinse recycle sump 69 beneath the belts 17 and 18. Excess water in the sump 69 overflows to the next lower sump 68. Provision is made to recycle part of the first rinse back to the rain trough 72 above the belts if desirable by utilizing the pressure head of the incoming fresh rinse water; otherwise the first sump 69 will overflow to the second sump 68 and freshen the water therein. The first rain trough 72 is equipped with an overflow 73 to the second 71, etc., to utilize all clean rinse water to the greatest extent for freshening succeeding rinses. The third rain trough 70 is identical to the second 71, and the operation is similar in all respects. Overflow from the third rain trough 70 provides the only input to the fourth rain trough 65. If the amount of water recycled by the steam eductor 74 plus that overflowing from the second trough 71 is not sufficient to cause the third trough 70 to overflow, there can be no fourth rinse. Maximum rinse water rate from any rain trough 65, 70, 71 and 72 is, for example, approximately 30 gallons per minute. Lower rates are available by throttling. There is no particular advantage in feeding more than 30 gallons per minute to any rain trough because it will simply overflow to the next trough below. The first rain trough 69 or final rinse is fed with hot, fresh water; therefore, there is no provision for heat make-up on the upper sump 69. Rain troughs 71 and 70 are fed from sumps 68 and 67, respectively, by means of steam eductors or ejector pumps 74 which add heat to the rinse water as it is recycled. Because the actual water lift is very small, the eductors 74 are controlled by throttling the steam make-up to obtain the desired rinse water temperature. The flow rates of the eductors 74 are limited by the sizing of the throat nozzles to an appropriate value, for example, approximately 30 gallons per minute, but the flows can be reduced by throttling the suction to the ejector pumps to eductors 74 by means of valves 75. Steam rates will be reduced in direct proportion to the water flow rate by the temperature controllers 82 in the sumps 67 and 68. It is not intended that rinse temperatures above 190° F. will be used with this system as inductor 74 instability may occur. Eductors 74 do not function well with boiling water; therefore, the suction temperature of each steam eductor 74 is regulated by a temperature controller 82 which operates the steam valve 76 feeding the eductor. If the flow rate to the eductor is reduced too much, the water within the eductor will come to a boil, and the eductor will stop pumping. The controller 82 should be set at 180° to 190° F. for best results. If boiling occurs in the throat, the remedy is to reduce the temperature setting and allow the temperature to drop until normal operation is restored.

Each rain trough 65, 70, 71 and 72 is fitted with a removable screen 215 (FIG. 9) to prevent possible blockage of the orifice holes 213 feeding the water curtain. The size of the screen 215 is such as to permit long periods of operation between cleanings. Rinse water flow rate can be adjustable from 25 to 55 gallons per minute depending on actual processing requirements. Rinse temperature is adjustable up to the boiling point in some cases, although the system is not designed for operation above 200° F. at the eductor 74 discharge. In general, the lower flow rates are obtained by using fewer water curtains and reducing the feed rates to the eductors or ejector pumps 74 by throttling. The higher flows are obtained by increasing recycle flow rates to ensure that all rain troughs 65, 70, 71 and 72 are in operation. The flow rates of said rain troughs can be reduced by underfeeding them to obtain a lower water head therein. Approximate flows as related to water heads are as follows:

| Head, inches | Flow, gallons per minute |
| --- | --- |
| 1 | 14.5 |
| 2 | 20.4 |
| 3 | 25.0 |
| 4 | 28.8 |

Maximum flow from a given rain trough occurs at the point of overflow where the head is 4 inches. The main reason for varying the rinse water flows is to control product leaching. By increasing recycle and reducing infeed rate, the solids level of the rinse water can be increased to any desired level consistent with the overall process material balance. The flow rate into the system is manually adjustable at the flowmeter 77.

Fines resulting from spalling of the product during cooking are removed from the cooker in two ways. The heavy fines which settle to the bottom pass through the belt and are moved along by the scrapers 216 (FIG. 6) fastened to the undersides of belts 17,18 to the fines-removal auger 64 in the upslope section for continuous discharge. Lighter fines and especially the smaller pieces become waterlogged and are occasionally suspended in the cook water when the density difference becomes sufficiently small. These fines either cling to the rough outer surface of the outgoing product or collect in the suction screens 59 of the circulating pumps. Fortunately, most of the fines are usually in the heavier category and can, therefore, be removed automatically. The lighter fines—scum, floaters, and other debris—which collect in the pump suction screens 59 must be removed manually at the rate of accumulation to avoid build-up. Some of the lighter fines which cling to the product are washed off by the rinse system and collect in the rinse recycle sumps 63, 67, 68 and 69. These fines are recovered in the main fines-removal system. The fines-removal auger 64 operating in the sump 63 slowly forces all fine material entering the sump 63 to the lower end and out the discharge opening to a second auger which squeezes out the water and discharges dewatered fines for recycling. The water removed is recycled internally. Fines collected in the rinse-recycle sumps 67, 68 and 69 are progressively flushed down into the sump 63 containing the auger 64 by the opening of valves 75 by the timer actuated solenoid valves 80. The frequency of the flush time is adjustable from 0 to 100 minutes to permit removal of fines at approximately the rate of accumulation. The period that the valves 75 remain open is adjustable as is the period that they remain closed. The auger speeds are variable; the lowest speed of each unit should be adequate to handle the small fines load expected. If not, the auger speeds can be increased as required by slightly changing the varidrive (not shown) that drives them.

Thus, a further function of the first three rinse sumps 67, 68, 69 is to route all fines washed from the product to the fines-removal sump 64. This routing is accomplished by a timed underflow flush system which progressively washes fines downward from sump to sump. The cycle time of the rinse-sump fines-flushing system is variable, as are the valve opening times. Too much flushing will needlessly deplete the rinse water, result in degradation of its quality, and generally reduce the efficiency of the rinse. In setting the fines-flush timer for the solenoid valves 80 one to three purge cycles per hour should be ample. The order of actuation of valves 80A, B and C and 84A, B and C should be from the lower purge valve to the higher in succession to avoid overflowing of sumps. Valve opening duration is not critical; however, once the fluid level in the upper sump 69 has dropped approximately 6 inches, the valve 84A should be closed because the head for flow is no longer available. Also, the sooner the sump 69 can begin to recover its level the better. Obviously, the purge rate cannot exceed the rinse water feed rate or the first sump 69 would never recover its full level between cycles.

Spent cook liquor overflows an adjustable weir 48 in the tank infeed section 5 and the discharged water is routed to the drain via line 217. Raising the weir 48 will increase the liquid level in the cooker, but will not change the discharge rate for more than a few minutes, because the outflow is determined by the inflow minus the water absorbed by the product.

The swollen, cooked, and leached product is first rinsed, then drained, and finally discharged onto a drier conveyor (not shown) at the product discharge section 87. The drier conveyor protrudes under the head shaft 94 and pulley 95 of the cooker conveyor. The drier conveyor and product discharge section 87 are designed and correleated as to gently drop the product onto the drier belt. The height of dropping is kept as small as possible to avoid physical damage during transfer. Special provisions are included to clean all residual product from the transfer zone to avoid any holdup of wet product in this area. This is done to insure no build-up of any wet product that might hang up on equipment in the transfer zone which could later develop high bacteria counts, fall off and contaminate the wet product being transferred to the drying process. Most of the openings in this area have been baffled to prevent escape of vapor into the room, and a large exhaust hood 100 collects any vapors which might escape at that point. An objective in the product discharge is to distribute the product evenly on the drier conveyor for even drying.

In the infeed section 5, just above the cook liquor, the steam purge manifold 49 is positioned with nozzles 50 directed to sweep the foam that gathers on the product across the cooker toward the discharge weir 48. The product guides 177 in this section have been modified to permit obstruction-free passage of foam and scum toward the discharge weir 48. The foam will burst and disengage or dissipate on contact by the steam; however, non-dispersible floating impurities will simply pass over the overflow weir 48 to the drain. Steam flow to the foam breaker manifold 49 is regulated by a simple non-indicating temperature controller 207 of the type used to control cook liquor temperature. The presence of steam at the controller 207 indicates the absence of foam, and an excess of foam will initiate steam injection by insulating the stem of the controller 207 causing its temperature to drop. The temperature controller 207 operates automatically once it has been properly adjusted. The set point is preferably between 195° and 210° F. The objective is to have the steam valve 208 closed most of the time and opened only when foam begins to accumulate around the stem of the controller 207.

The belt prerinse station 107 uses two reservoirs 114 and 119 with two pumps 118, two level controllers 121, spray manifolds 112 with two rows of over/under spray nozzles 113 directed toward the belts 17, 18, two pneumatic valves 117, a steam valve 117A, and a steam eductor 116. Incoming water from the other rinse stations (e.g. 201 and 136) collects in the reservoir 119, from which it is filtered, heated, and then fed to the spray manifolds 112. The reservoir 114 is located below the spray manifolds 112 to catch the spent rinse water and any solids washed from the belts 17, 18. Flow through the system is preferably continuous without recirculation between the reservoirs 114 and 119. The purpose of the belt prerinse system 107 is to remove most of the product fines adhering to the belts 17, 18 and their chains immediately after the cooked and rinsed product has been discharged to the drier; this takes most of the solids load off the detergent wash system 108. Thus, the solids are washed with the spent rinse water into the second reservoir 114. This water is continuously pumped from the system to filters for removal of fines. A temperature controller 123 in the reservoir 114 senses the temperature of the water falling from the belts 17, 18 and regulates the heat input to the water being fed to the manifolds 112 through valve 117A and eductor 116, thus avoiding a drop in belt temperature which might promote biological growth. Operation of the belt prerinse station is carried out by starting the pump 118 on the reservoir 119 to feed water to the spray manifolds 112. The pump 118 on the second reservoir 114 is then started to pump spent rinse water out of the system through valve 117C. The flow rate of this pump is regulated by level controller 121 in the reservoir 114 which operates the throttling valve 117C on the pump 18 discharge to keep the reservoir 114 from running dry. The temperature controller 123 becomes operative as soon as the steam and instrument air are turned on. The action of level controllers 121 is different. The action is reverse on the supply reservoir 119 (decreasing level causes an increasing flow of air to the make-up valve 117B), and direct on the catch reservoir 114 (increasing level causes increasing air output to the discharge valve 117C).

Turning the controller 119 or 114 upside down reverses the action of the controller by inverting the float. The air output from the level controllers 114 and 119 should be adequate to handle the requirements of valves 117B, C. Otherwise, the controller outputs can be amplified by air booster relays. The only adjustment on the controllers 114, 119 usually is an air bleed which changes the sensitivity of the controller by wasting some of the air output. Maximum air bleed gives lowest sensitivity.

The entire belt-wash water rate is determined by the feed rate to the belt-prerinse spray manifolds 112. As this water leaves the system as through valve 117C, it creates a demand for make-up water in the previous reservoirs 114, 119. The flow rate can be changed only by varying the size of the nozzles 113.

A low-water-shutdown system is advantageously provided. If the pumps 118 should be started with the system drained, or without sufficient water due to some malfunction, pressure switches 112 in the level-control mechanism will break the control circuit and stop the pumps 118 to prevent damage to the pump seals. Once the deficiency in water level has been corrected, operation of the pumps 118 can be started again. The pump-shutdown pressure switches 122 are preferably set to stop the pumps before the pump suction pipes becomes uncovered.

The belt detergent wash system 108 consists of the two reservoirs 124A and B of detergent solution and three manifolds 125 equipped with nozzles 126 for spraying the belts 17,18. The main reservoir 124A is just below the spray manifolds 125 and is equipped with the high-pressure centrifugal pump 127 and the make-up heater in the form of the eductor 128. The second reservoir 124B serves as a reverse supply for make-up of losses of solution from the main reservoir 124A. Filters are provided between the pump and the spray manifolds 125 to prevent plugging of the spray nozzles 126 by solids washed from the belts 17,18. The spray manifolds 125 are located two above and one below the belts 17,18. Nearly all wash water drains back into the system for reuse, and level controls 131 are provided to add make-up water to the system as required. The main reservoir 124A is replenished from the supply reservoir 124B with detergent solution. The supply reservoir 124B is replenished with fresh, hot make-up water from the reservoir 119 of the first rinse system 107. Water losses from the detergent wash system 108 are small, so dilution due to water make-up is negligible.

The belt-rinse system 109 uses recirculating, hot, fresh-water spray rinse for removal of detergent residuals from the belts 17,18. The hot water is contained in the reservoir 136 mounted below the belts 17,18 and is pumped to the spray manifolds 137 and nozzles 138 located directly above the reservoir. A filter and the direct-injection steam heater 140 are provided to condition the water before it enters the spray nozzles 138. Steam make-up to the heater 140 is regulated by the temperature controller 145 in one end of the reservoir 136. The water in the reservoir 136 is continuously replenished by make-up from the rinse water supply reservoir 201 at the feed end of the cooker. Rinse water in excess of that required to maintain the preset operating level is continuously pumped out of the reservoir 136 to the belt prerinse system 107 by the transfer pump 139A. The discharge of this pump is throttled by the valve 117 operated by the level controller 121 of reservoir 119. Low level in the reservoir 137 will actuate the pressure switch 146 which stops both pumps 139A and B until the condition is corrected. Operation of the belt-rinse system 109 is initiated by starting the pumps 139A and B and providing steam and instrument air to the controllers 142 and 145. The temperature and level controllers 145 and 142, respectively, and the low-level pump-safety switch 146 have adjustable set points which do not ordinarily require further attention after the initial adjustment. Appropriate set points are 200° F. for the temperature controller 145 and the centerline of the float for water level controller 142.

The belt-sterilization system 111 utilizes the manifold 193 mounted above the belts 17,18 with multiple fan-pattern spray nozzles 194 directed toward the belts. Superheated steam from the nozzles 194 hits the belts 17,18 at a small angle and travels along the belt, counter to its direction of travel, to achieve maximum heating from the steam. Surplus steam from this system travels along the underside of the belts 17,18 in the same direction as the product to preheat the belts and maintain a temperature of 180° F. In the alternate sterilization modes, hot water can be substituted for the superheated steam by closing valve 200 and opening valves 186 and 192. If desired, a three-way valve can replace these three valves and the conversion from steam to hot water can be achieved by changing the position of a three-way selector valve. The system will then function as a second "sterilizing" rinse. This is true from a practical standpoint, although a higher temperature may be required to kill all bacteria. Cold chlorinated water can also be used during down periods by closing valves 200 and 186 and opening valves 191 and 192. When hot water is used instead of steam, the need arises to catch the spray from the nozzles 194 for recycling. The large water reservoir 201 is provided below the spray manifold 193 for this purpose. The reservoir 201 is equipped with a circulating pump 197 and level control 202, but no make-up heater; the make-up water to this system comes directly from the main water-heating system 184, and any desired supply temperature can be obtained, even above the normal boiling point if necessary. The hot water supply temperature also determines the temperature of the product rinse water supply for rinse system 109 so the needs of both systems should be considered when adjustments are made. When chlorinated water is used in this system, the water should be cool, since chlorine is not very soluble in hot water and cannot be kept in solution long enough to be effective. The chlorinated water is most effective for sterilizing during down time or just before start-up. A purpose of chlorination is to "sweeten" the belts and eliminate any foul odors due to poor cleanup or other mishap.

To operate the steam sterilization system 201, the high-pressure boiler which supplies the superheated steam through pipe 196 must be in operation. The superheat is obtained by throttling high pressure, high temperature steam, e.g., at 540 p.s.i., 480° F. As the pressure is reduced to near atmospheric, most of the high temperature is conserved, resulting in low-pressure steam, e.g., at about 350° F. When the steam safety valve is open and the three-way selector valve is properly positioned, superheated steam will be discharged at the nozzles 194 of the sterilizing manifold 193. The steam flow rate can be regulated to some extent by changing the setting of the pressure-reducing valve 195 in the steam supply line 196. When it is desired to use chlorinated water, the hot water system and steam system are first disabled and then the chlorinator feed pump is started. This feed pump passes water through a small eductor, which in turn creates a negative pressure at a chlorine supply regulator. Chlorine can be withdrawn from the supply system only by a negative pressure, thereby precluding the possibility of chlorine leaks into the building. All chlorine aspirated into the system is absorbed into the feed water creating the negative pressure; therefore, any leaks are into the system.

The fines flush system in the first and second inclined rinse sections 62 and 66 provides an automatic timed sequence of operation for the solenoid valves 80 and valves 84 operated by said solenoid valves that flush through pipes 79 the accumulated fines from each of the three sumps 67, 68 and 69 located in the rinse section of the cooker. Coincident with the starting of the motor for the fines-removal screw 64, the first of three solenoid valves 80A opens and valve 84A opens and water is flushed from the first sump 69 into the second sump 68. After a timed interval, the first valve 84A closes and the second solenoid valve 80B and valve 84B are opened, flushing the fines from the second 68 to the third sump 67. After a second timed interval, the second valve 84B closes and the third solenoid valve 80C and third valve 84C open, flushing the fines from the third sump 67 into the screw conveyor sump 63. After a third timed interval, the third valve 84C closes and all three valves remain closed. After a time lag of perhaps twenty to thirty minutes more or less (the time can be set on a digital indicating timer located within the operator control console), the above sequence repeats.

The house steam line 188 to the twenty recirculating pumps 55 on the cooker is provided with a solenoid operated valve 220. Steam is prohibited from entering the system unless the system is in a condition to accept steam. If the water in the cook tank 42 is above a certain safety level the steam valve 220 can be opened. The steam valve 220 can turn off automatically if the water level in the cook tank falls below a predetermined safety level.

The cover 150 is provided with the cover-lift mechanism hereinbefore described so that the cooker can be opened for cleaning and inspection. A key switch on the operator control console controls the raising and lowering of the cover. Once the key has been inserted and turned to ON, the cover 150 is raised or lowered by depressing and holding the appropriate up button or down button on the control console. With either button depressed, an alarm sounds intermittently as long as the lift motor 172 is in operation. When the lift mechanism is fully extended, limit switches stop the motor 172. Limit switches are appropriately placed to turn off motor 172 when the cover 150 has been lowered to its fully closed position. The cover lift mechanism will not function unless the product belt drive mechanism at the discharge end of the cooker has been properly prepared as described hereinafter.

There are two motors 22 and 93 involved in providing power to move the product belts 17,18 through the cooker. One of these, the motor 93 located in the discharge section 11 of the cooker, is the master motor. It draws the belts 17,18 through the cook tank 42 and establishes the speed at which the belts 17,18 will operate. The other motor 22, the slave motor, is located on the product infeed of the cooker. It provides power to draw the belts 17,18 back underneath the cook tank 42, and its speed is automatically adjusted to approximate the speed at which the master motor 93 is operating by monitoring the position of the belt take-up pulley 19 in the dancer system on the infeed end of the cooker. A dancer rheostat is provided for this purpose. The slave motor 22 speed is modulated as the dancer changes position in such a way that the belt take-up pulley 19 tends to move back into the center of its range of travel. Limit switches are provided at the ends of travel of this dance mechanism, and of the dance mechanism at the outfeed end of the cooker. If either of these mechanisms moves to the extreme limits of its travel and operates the limit switch, the belt drive system will turn off. Simultaneously, an alarm operates on the operator control console and the audible alarm sounds.

In order to raise the cover 150, it is first necessary to provide slack in the belts 17,18 because the upper flights of said belts ride on fixed tracks 20 which go up with the cover 150. This enables operators to clean the bottom of the tank 42 and the underside of the belts 17,18. Slack is provided for the belts 17,18 by moving the take-up shaft 98 at the discharge end 11 towards the head and tail shafts 94,96.

The horizontal drive shafts of the hood lifting mechanism disposed parallel to the longitudinal axis of the cooker and along each side of the hood, are provided with couplings within each shaft length between the vertical jack screws 152. The couplings allow horizontal expansion and contraction of the shafts in the shaft center line direction thereby permitting thermal expansion of the shafts and the entire cover 150. Openings are provided at regularly spaced intervals along the entire length of the cover. Hatches or removable doors are provided to close and seal these openings which are provided throughout the length of the cooker. These hatches or doors are provided with suitable rubber gaskets or sealing strips to prevent the exit of cooking vapors when the hatches or doors are closed. The gaskets or sealing strips are adhesively attached to the four formed surfaces comprising the edges of the doors or hatches and seat onto the matching surfaces along the edges of the openings.

FIG. 15 illustrates an externally flushed fresh water seal 222, guttering 223 for collecting and removing condensate forming on the internal surface of the cover 150, and guide means 224 for cover 150. The externally flushed fresh water seal 222 comprises a trough 225 fixed to the upper longitudinal edges of tank 42 and extending the entire length of said tank on both sides thereof. The trough 225 is filled with fresh water 226 which is maintained at a given level in said trough. Either continuously or from time to time, the water 226 in the trough 225 is flushed out and replaced with fresh water. The outer, lower, longitudinal edges of the cover 150 on both sides thereof are provided with a downwardly depending sealing flange 227 which extends for the length of the trough 225. The sealing flanges 227 is so positioned on the cover 150 that, when the cover is in its closed (down) position, the sealing flange 227 is disposed within the trough 225 and within the water 226 in the trough 225. In this manner, the interior of tank 42 and cover 150 are effectively sealed from the exterior atmosphere and passage of vapors from the interior to the exterior is prevented.

The guttering 223 has an angular cross-section as shown in FIG. 15 including a leg 228 that extends to and is fixed to the underside of cover 150 along its outer edge on both sides thereof and a leg 229 extending inwardly at an angle to leg 228. The guttering 223 extends for the entire length of the cover. Condensation that forms on the interior under surface of cover 150 runs down said under surface until it encounters leg 228 of guttering 223. The condensation runs down leg 228 to the interior bottom of guttering 223 which is longitudinally tilted towards one or both ends of the cover 150. Thus, said condensation runs along guttering 223 to one or both ends of the cover 150 where it is removed and directed to drain.

The interior lower longitudinal sides of tank 42 are provided with tapered guides 224 at regularly spaced intervals along the entire length of tank 42. The guides 224 taper from a point at its top end to its widest part near its bottom end. The guides 224 serve to guide the outboard upper fixed tracks 20 to the proper transverse position in tank 42 and serve to hold the tracks in proper alignment during use.

FIG. 15 also illustrates a modified use of scrapers 216. The area of the tank 42 immediately below the wire mesh conveyor belt 18 and above the bottom surface 105 of the cooking tank and its approach and exit slopes is swept or cleaned by a series of rectangular blades or scrapers 216. The scrapers are attached to the underside of the wire mesh belt 18 by suitably shaped spring clips and are so disposed that the lower edges of said scrapers contact the bottom upper surface 105 of the tank and can hinge backwards about the upper horizontal edges from their normally vertical position whenever the dimension between the mesh belt 18 and the tank bottom 105 decreases due to constructional variation. The scrapers 216 are attached to the underside of the belt 18 with their flat surfaces forward-facing surface at 90° to the direction of belt motion. The scrapers 216 are disposed in rows across the belt 18 in a diagonal pattern such that they overlap each other when viewed in front elevation, thereby moving any product or other matter on the tank bottom 105 along with the belt motion to sump 63 from which it is removed as previously described.

In starting up the apparatus of this invention the following is an illustration of a procedure that can be used:

1. Start hood exhaust fans 40 and 102.
2. Start product infeed conveyor 12.
3. Open main steam valve to heater 184 and set for proper temperature. Open main fill valve 185 (and 186) to clean-in-place header pipe starting 45-minute fill time.
4. When water reaches the 4-inch level, start the main belt drive, and set the cook time.
5. Start rinse systems 107 and 109.
6. Start detergent system 108 by adding proper quantity of detergent and water and starting the pumps 127.
7. Start superheated steam system to manifold 193.
8. Open valve to water curtain through 27.
9. When water reaches and overflows the water box overflow weirs 53, start the 20 pumping stations at the ten intermediate sections 7.
10. When water level reaches the desired point for proper cooking, a level-control mechanism can be provided which will automatically stop the water-input and sound an audible alarm indicating the system is ready for entry of product infeed.
11. Open valve 208 to admit steam to foam breaker manifold 49.

12. Start the vibration feeder 13. Make adjustment to leveling bar 15, if required, to effect an even depth of product spread, e.g., 1½ inch deep, on the cooker belts 17, 18.
13. Start the fines-removal auger 64.
14. Start the product-rinse system at inclined rinse sections 62 and 66 to ensure entry of make-up water and a flow of cooking liquor counter to the flow of food product.

In order to shut down operation of the cooker, the following procedure illustrates a suitable procedure that can be used:

1. Prior to shutdown, stop the further feeding of food product to hopper 1.
2. Stop the vibration feeders 13.
3. Allow remaining product to complete its movement through the cooker.
4. When cooker is empty of product, shut down the product-rinse system at the rinse sections 62 and 66 and shut down the superheated steam.
5. Open drains at various pumping stations to empty the cooker tank 42 and stop all pumps.

To clean the apparatus the following procedure illustrates one that can be used:

1. After the tank 42 is empty, close all drain valves and open main fill valve 185 to clean-in-place header 180, thus starting 45-minute fill time.
2. Add detergent to reservoirs 124A and B.
3. Open side and bottom access panels and clean the bottom trough and returns of belts 17, 18.
4. When water level in main tank 42 reaches about 4 inches, the level-indicator alarm will sound.
5. When water in main tank 42 reaches the water box overflow weir level 53, a level-indicator alarm will sound again. Start pumps at the 20 pumping stations in the 10 intermediate sections 7 to begin recirculation through these sections.
6. When water in main tank 42 reaches the cooking level, the level-control mechanism will automatically stop the water input and sound an alarm. At this point, start the belt drive and allow recirculation to proceed at about 205° F. for 30 to 45 minutes to ensure a thorough detergent wash.
7. During detergent-recirculation and rinse period:
 a. Brush down the outside cooker surfaces with detergent solution and rinse with Strahman mixing station hoses.
 b. Wipe dry the bottom trough, return belts 17, 18 and panels 45, 46.
 c. Test pH and plate count; if satisfactory, close panels. If pH and plate count are not satisfactory, again clean and dry those parts of the system failing the test and then test anew for pH and plate count.
8. Upon completing the detergent-recirculation and cleanup process described above, turn off all recirculation valves, close the main tank fill valve, and drain the tank again to 4-inch level.
9. Raise the main cover 150 and the upper flights of conveyor belts 17,18.
10. With the cover 150 in the fully raised position, brush down the interior tank 42 walls and the conveyor belts 17,18 and rinse with the Strahman hoses.
11. Completely drain tank 42 and lower cover 150.
12. Open cover doors 221 and brush down all struts and hood-structure members and rinse with the Straham hose.
13. Close cover doors 221 and refill as described in step 1 above, but without detergent, and recirculate rinse water for 30 to 45 minutes, checking pH of tank water at various points. If pH and plate count should be too high, another rinse will be required.
14. When pH and plate count are in desired range, drain and wipe inside of unit as dry as possible.
15. Shut down return belt detergent wash system 108 and rinse systems 107 and 109 and close off all drain lines. Shut down boiler, superheater, air compressors and exhaust fans.
16. Remove all basket strainers on cooker, product-rinse system, sump strainers and floor drains and steam-clean them, then replace them in their respective positions.

What is claimed is:

1. Apparatus for continuously cooking and leaching food pieces with a cooking liquid at elevated temperature comprising:
 (a) an elongate tank for said liquid having a product infeed end and an inclined product discharge end;
 (b) a driven endless conveyor having an upper flight which passes through said liquid in said tank for carrying said food pieces through said liquid, the portion of said endless conveyor adjacent said inclined discharge end of said tank being similarly inclined;
 (c) a plurality of means along each side of said tank for withdrawing liquid from said tank at spaced apart points along each side of said tank;
 (d) means for heating said withdrawn liquid;
 (e) means for returning said heated withdrawn liquid to said tank at a plurality of points along the center line thereof;
 (f) spraying means located above said inclined portions for rinsing with cooking liquid said food pieces traveling of said conveyor prior to discharge; and
 (g) liquid overflow means formed in said tank at said infeed end to provide a flow of said liquid in said tank from said spraying means to said overflow means in a direction opposite the movement of said food pieces through said tank.

2. Apparatus as claimed in claim 1 wherein said conveyor comprises two side-by-side conveyor belts having a space therebetween through which said heated liquid is returned to said tank.

3. Apparatus as claimed in claim 1 which includes a duct extending along the bottom of and beneath said tank, said endless conveyor having a lower (return) flight returning through said duct from said discharge end to said infeed end and means for rinsing and washing said conveyor in said duct as it travels from said discharge end to said infeed end.

4. Apparatus as claimed in claim 3 which includes means for imposing sterilizing conditions on the interior of said duct.

5. Apparatus as claimed in claim 4 wherein said means for imposing sterilizing conditions includes means for impinging superheated steam on said conveyor in said duct.

6. Apparatus as claimed in claim 4 which includes means for impinging hot water on said conveyor in said duct for sterilizing same.

7. Apparatus as claimed in claim 4 which includes means for contacting said conveyor in said duct with chlorine.

8. Apparatus as claimed in claim 3 wherein said means for washing includes means for applying detergent to said conveyor in said duct.

9. Apparatus as claimed in claim 3 wherein said duct is provided with a plurality of access doors to permit inspection and cleaning of the duct interior and contents.

10. Apparatus as claimed in claim 1 wherein said portion of said tank adjacent its product discharge end is provided with at least one sump extending transversely across said tank below said sprayers for receiving fines rinsed off of said food by said sprayers.

11. Apparatus as claimed in claim 10 wherein said sump is provided with means for removing said fines therefrom.

12. Apparatus as claimed in claim 10 which includes means for recycling liquid from said sump to said sprayers.

13. Apparatus as claimed in claim 10 wherein said conveyor is provided with a plurality of wiping means on the underside thereof which contact the interior bottom of said tank to sweep fines collecting there to said sump adjacent said discharge end.

14. Apparatus as claimed in claim 1 further comprising:
    (a) a cover over said tank to reduce contamination; and
    (b) means extending the full length of said cover for collecting and removing condensate formed on the internal surfaces of said cover.

15. Apparatus as claimed in claim 1 further comprising:
    (a) a cover over said tank to reduce contamination; and
    (b) an externally flushed, fresh water seal on the outboard edges of said cover to seal said cover to said tank and minimize the escape of moisture.

16. Apparatus as claimed in claim 14 which includes means for lifting said cover and said upper flight of said conveyor for inspection and cleaning.

17. Apparatus as claimed in claim 16 wherein said tank is supported by a plurality of legs and said lifting means comprises jack screws mounted on said cover and nuts mounted on said legs, said jack screws operatively engaging said nuts for raising and lowering said cover.

18. Apparatus as claimed in claim 16 wherein said cover is provided with tracks depending from its underside and on which the upper flight of said endless conveyor rides and slackening means is provided for said endless conveyor whereby said upper flight is raised with said cover after slackening said conveyor.

19. Apparatus as claimed in claim 16 which includes removable product guide means mounted on the underside of said cover and extending substantially the full length of said tank for maintaining said food pieces on said conveyor as they travel from said infeed end to said discharge end, said guide means extending downwardly to a point above said conveyor.

20. Apparatus as claimed in claim 1 which includes means for feeding food pieces onto said conveyor at the infeed end of said tank.

21. Apparatus as claimed in claim 1 which includes means for spraying liquid onto the top of the upper flight of said conveyor, said means for spraying extending for substantially the length of said tank.

22. Apparatus as claimed in claim 1 wherein said tank is mounted on a plurality of rollers for thermal expansion and contraction.

23. Apparatus as claimed in claim 13 wherein said cover is provided with a plurality of access doors for inspection and cleaning.

24. Apparatus as claimed in claim 1 further comprising:
    (a) a cover over said tank to reduce contamination; and
    (b) exhaust means above each end of said tank for collecting and exhausting escaped moisture.

25. Apparatus as claimed in claim 1 further comprising:
    (f) means for forming a curtain of cooking liquid falling on said food pieces at said infeed end to suppress dust formation.

26. Apparatus as claimed in claim 1 further comprising:
    (f) means for suppressing foam formation at the point at which said food pieces enter said liquid in said tank.

27. Apparatus as claimed in claim 26 wherein said means for suppressing foam includes means for directing steam onto said liquid adjacent the area at which said food pieces enter said liquid.

* * * * *